United States Patent
Tajik et al.

(10) Patent No.: US 12,143,660 B2
(45) Date of Patent: *Nov. 12, 2024

(54) MIXED REALITY VIRTUAL REVERBERATION

(71) Applicant: Magic Leap, Inc., Plantation, FL (US)

(72) Inventors: Anastasia Andreyevna Tajik, Fort Lauderdale, FL (US); Jean-Marc Jot, Aptos, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,071

(22) Filed: Sep. 20, 2023

(65) Prior Publication Data

US 2024/0015352 A1 Jan. 11, 2024

Related U.S. Application Data

(63) Continuation of application No. 17/943,057, filed on Sep. 12, 2022, now Pat. No. 11,800,174, which is a (Continued)

(51) Int. Cl.
*H04N 21/422* (2011.01)
*G06F 3/16* (2006.01)
(Continued)

(52) U.S. Cl.
CPC ....... *H04N 21/42203* (2013.01); *G06F 3/165* (2013.01); *H04N 21/439* (2013.01); *H04N 21/816* (2013.01); *H04R 5/04* (2013.01)

(58) Field of Classification Search
CPC .......... H04N 21/42203; H04N 21/439; H04N 21/816; G06F 3/165; H04R 5/04
See application file for complete search history.

(56) References Cited

U.S. PATENT DOCUMENTS 4,852,988 A 8/1989 Velez
4,953,219 A 8/1990 Kasai et al.
(Continued)

FOREIGN PATENT DOCUMENTS

CA 2316473 A1 1/2001
CA 2362895 A1 12/2002
(Continued)

OTHER PUBLICATIONS

Canadian Office Action dated Oct. 31, 2023, for CA Application No. 3,078,420, three pages.
(Continued)

*Primary Examiner* — Yassin Alata
(74) *Attorney, Agent, or Firm* — Morrison & Foerster LLP

(57) ABSTRACT

A method of presenting an audio signal to a user of a mixed reality environment is disclosed, the method comprising the steps of detecting a first audio signal in the mixed reality environment, where the first audio signal is a real audio signal; identifying a virtual object intersected by the first audio signal in the mixed reality environment; identifying a listener coordinate associated with the user; determining, using the virtual object and the listener coordinate, a transfer function; applying the transfer function to the first audio signal to produce a second audio signal; and presenting, to the user, the second audio signal.

20 Claims, 12 Drawing Sheets

Related U.S. Application Data continuation of application No. 16/970,331, filed as application No. PCT/US2019/018368 on Feb. 15, 2019, now Pat. No. 11,477,510.

(60) Provisional application No. 62/631,418, filed on Feb. 15, 2018.

(51) Int. Cl.
  *H04N 21/439* (2011.01)
  *H04N 21/81* (2011.01)
  *H04R 5/04* (2006.01)

(56) References Cited

U.S. PATENT DOCUMENTS

| | | |
|---|---|---|
| 5,491,754 A | 2/1996 | Jot |
| 5,555,306 A | 9/1996 | Gerzon |
| 5,812,674 A | 9/1998 | Jot |
| 6,188,769 B1 | 2/2001 | Jot |
| 6,433,760 B1 | 8/2002 | Vaissie |
| 6,453,047 B1 | 9/2002 | Dicker |
| 6,491,391 B1 | 12/2002 | Blum et al. |
| 6,665,407 B1 | 12/2003 | Dicker |
| 6,798,889 B1 | 9/2004 | Dicker |
| 6,847,336 B1 | 1/2005 | Lemelson |
| 6,917,686 B2 | 7/2005 | Jot |
| 6,943,754 B2 | 9/2005 | Aughey |
| 6,977,776 B2 | 12/2005 | Volkenandt et al. |
| 6,978,027 B1 | 12/2005 | Dahl |
| 7,099,482 B1 | 8/2006 | Jot |
| 7,149,314 B2 | 12/2006 | Dahl |
| 7,231,054 B1 | 6/2007 | Jot |
| 7,257,231 B1 | 8/2007 | Avendano |
| 7,315,624 B2 | 1/2008 | Avendano |
| 7,347,551 B2 | 3/2008 | Fergason et al. |
| 7,412,380 B1 | 8/2008 | Avendano |
| 7,488,294 B2 | 2/2009 | Torch |
| 7,561,699 B2 | 7/2009 | Jot |
| 7,567,845 B1 | 7/2009 | Avendano |
| 7,848,531 B1 | 12/2010 | Vickers |
| 7,928,311 B2 | 4/2011 | Trivi |
| 7,970,144 B1 | 6/2011 | Avendano |
| 8,000,485 B2 | 8/2011 | Walsh |
| 8,019,093 B2 | 9/2011 | Avendano |
| 8,107,631 B2 | 1/2012 | Merimaa |
| 8,235,529 B1 | 8/2012 | Raffle |
| 8,280,077 B2 | 10/2012 | Avendano |
| 8,345,899 B2 | 1/2013 | Merimaa |
| 8,374,365 B2 | 2/2013 | Goodwin |
| 8,379,868 B2 | 2/2013 | Goodwin |
| 8,488,796 B2 | 7/2013 | Jot |
| 8,611,015 B2 | 12/2013 | Wheeler |
| 8,619,998 B2 | 12/2013 | Walsh |
| 8,638,498 B2 | 1/2014 | Bohn et al. |
| 8,696,113 B2 | 4/2014 | Lewis |
| 8,712,061 B2 | 4/2014 | Jot |
| 8,831,255 B2 | 9/2014 | Crawford |
| 8,879,750 B2 | 11/2014 | Walsh |
| 8,908,874 B2 | 12/2014 | Johnston |
| 8,929,589 B2 | 1/2015 | Publicover et al. |
| 9,010,929 B2 | 4/2015 | Lewis |
| 9,014,377 B2 | 4/2015 | Goodwin |
| 9,042,565 B2 | 5/2015 | Jot |
| 9,197,979 B2 | 11/2015 | Lemieux |
| 9,253,574 B2 | 2/2016 | Thompson |
| 9,274,338 B2 | 3/2016 | Robbins et al. |
| 9,292,973 B2 | 3/2016 | Bar-zeev et al. |
| 9,323,325 B2 | 4/2016 | Perez et al. |
| 9,386,373 B2 | 7/2016 | Ma |
| 9,391,579 B2 | 7/2016 | Walsh |
| 9,432,790 B2 | 8/2016 | Raghuvanshi et al. |
| 9,496,850 B2 | 11/2016 | Jot |
| 9,530,421 B2 | 12/2016 | Jot |
| 9,558,757 B1 | 1/2017 | Li |
| 9,591,427 B1 | 3/2017 | Lyren |
| 9,697,844 B2 | 7/2017 | Walsh |
| 9,720,505 B2 | 8/2017 | Gribetz et al. |
| 9,728,181 B2 | 8/2017 | Jot |
| 9,754,597 B2 | 9/2017 | Jot |
| 9,779,731 B1* | 10/2017 | Haskin ................ G10L 15/20 |
| 9,794,721 B2 | 10/2017 | Goodwin |
| 9,865,245 B2 | 1/2018 | Kamdar |
| 9,906,885 B2 | 2/2018 | Visser et al. |
| 9,924,289 B2 | 3/2018 | Trivi |
| 10,013,053 B2 | 7/2018 | Cederlund et al. |
| 10,025,379 B2 | 7/2018 | Drake et al. |
| 10,038,967 B2 | 7/2018 | Jot |
| 10,063,207 B2 | 8/2018 | Malak et al. |
| 10,440,498 B1 | 10/2019 | Amengual Garí |
| 10,531,220 B2 | 1/2020 | Sanger et al. |
| 10,609,502 B2 | 3/2020 | Zhang et al. |
| 10,616,705 B2 | 4/2020 | Schmidt |
| 10,645,520 B1 | 5/2020 | Amengual Gari et al. |
| 10,674,307 B1 | 6/2020 | Robinson et al. |
| 10,685,641 B2 | 6/2020 | Asada et al. |
| 10,735,884 B2 | 8/2020 | Audfray et al. |
| 10,863,301 B2 | 12/2020 | Schmidt |
| 10,880,668 B1 | 12/2020 | Robinson et al. |
| 10,952,010 B2 | 3/2021 | Audfray et al. |
| 11,184,727 B2 | 11/2021 | Jeon et al. |
| 11,304,017 B2 | 4/2022 | Parvaix et al. |
| 11,477,510 B2 | 10/2022 | Tajik et al. |
| 11,540,072 B2 | 12/2022 | Parvaix et al. |
| 11,778,398 B2 | 10/2023 | Parvaix et al. |
| 11,800,174 B2 | 10/2023 | Tajik et al. |
| 11,895,483 B2 | 2/2024 | Schmidt |
| 2003/0030597 A1 | 2/2003 | Geist |
| 2003/0159569 A1 | 8/2003 | Ohta |
| 2006/0023158 A1 | 2/2006 | Howell et al. |
| 2007/0160241 A1 | 7/2007 | Joublin |
| 2007/0173730 A1 | 7/2007 | Bikko |
| 2009/0220100 A1 | 9/2009 | Ohta et al. |
| 2011/0081023 A1 | 4/2011 | Raghuvanshi |
| 2011/0211056 A1 | 9/2011 | Publicover et al. |
| 2011/0213664 A1 | 9/2011 | Osterhout |
| 2011/0235813 A1 | 9/2011 | Gauger, Jr. |
| 2011/0251704 A1 | 10/2011 | Walsh |
| 2011/0268283 A1 | 11/2011 | Nakadai |
| 2012/0021806 A1 | 1/2012 | Maltz |
| 2012/0093320 A1 | 4/2012 | Flaks |
| 2013/0041648 A1 | 2/2013 | Osman |
| 2013/0077147 A1 | 3/2013 | Efimov |
| 2013/0236040 A1 | 9/2013 | Crawford |
| 2014/0153727 A1 | 6/2014 | Walsh et al. |
| 2014/0195918 A1 | 7/2014 | Friedlander |
| 2014/0270184 A1 | 9/2014 | Beaton |
| 2014/0282663 A1* | 9/2014 | Lee ................ H04R 3/005 725/18 |
| 2014/0320389 A1 | 10/2014 | Scavezze |
| 2015/0168731 A1 | 6/2015 | Robbins |
| 2015/0302652 A1 | 10/2015 | Miller |
| 2015/0380010 A1 | 12/2015 | Srinivasan |
| 2016/0027216 A1 | 1/2016 | Da Veiga et al. |
| 2016/0027218 A1 | 1/2016 | Salter et al. |
| 2016/0057522 A1 | 2/2016 | Choisel et al. |
| 2016/0088417 A1 | 3/2016 | Kim |
| 2016/0212272 A1 | 7/2016 | Srinivasan |
| 2016/0212538 A1 | 7/2016 | Fullam et al. |
| 2016/0360332 A1 | 12/2016 | Shin et al. |
| 2017/0041445 A1 | 2/2017 | Ukai et al. |
| 2017/0080229 A1 | 3/2017 | Meister |
| 2017/0126194 A1 | 5/2017 | Jot |
| 2017/0127212 A1 | 5/2017 | Jot |
| 2017/0208415 A1 | 7/2017 | Ojala |
| 2017/0208416 A1 | 7/2017 | Petrov |
| 2017/0223478 A1 | 8/2017 | Jot |
| 2017/0230760 A1 | 8/2017 | Sanger et al. |
| 2017/0238119 A1 | 8/2017 | Schlecht et al. |
| 2017/0325043 A1 | 11/2017 | Jot |
| 2018/0020312 A1 | 1/2018 | Visser et al. |
| 2018/0045963 A1* | 2/2018 | Hoover ................ G06F 3/011 |
| 2018/0206046 A1 | 7/2018 | Rosenkranz et al. |
| 2018/0359582 A1 | 12/2018 | Belhomme et al. |

(56) References Cited

U.S. PATENT DOCUMENTS

| | | | |
|---|---|---|---|
| 2019/0387352 A1 | 12/2019 | Jot et al. | |
| 2020/0320768 A1 | 10/2020 | Salemme et al. | |
| 2020/0381007 A1 | 12/2020 | Hur et al. | |
| 2020/0382895 A1 | 12/2020 | Schissler | |
| 2021/0110809 A1 | 4/2021 | Lastrucci | |
| 2021/0160647 A1 | 5/2021 | Schmidt et al. | |
| 2023/0403524 A1 | 12/2023 | Parvaix | |
| 2024/0137725 A1 | 4/2024 | Schmidt | |

FOREIGN PATENT DOCUMENTS

| | | | | |
|---|---|---|---|---|
| CA | 2388766 A1 | 12/2003 | | |
| GB | 2536020 A | * 9/2016 | ............ | G06F 3/165 |
| JP | S5264974 A | 5/1977 | | |
| JP | 2005012784 A | 1/2005 | | |
| JP | 2009139615 A | 6/2009 | | |
| JP | 2011232691 A | 11/2011 | | |
| JP | 2014026241 A | 2/2014 | | |
| JP | 2014505420 A | 2/2014 | | |
| JP | 2019527956 A | 10/2019 | | |
| KR | 1020160005695 | 1/2016 | | |
| WO | 2012093352 A1 | 7/2012 | | |
| WO | 2018026828 A1 | 2/2018 | | |
| WO | 2019079523 A1 | 4/2019 | | |

OTHER PUBLICATIONS

Examination Report dated Nov. 1, 2023, for NZ Application No. 763667, four pages.
Japanese Office Action mailed Nov. 6, 2023, for JP Application No. 2022-523600, with English translation, six pages.
Korean Notice of Allowance dated Oct. 31, 2023, for KR Application No. 10-2020-7013593, with English translation, four pages.
Notice of Allowance mailed Nov. 17, 2023, for U.S. Appl. No. 17/089,593, filed Nov. 4, 2020, seven pages.
Japanese Notice of Allowance mailed Feb. 16, 2024, for JP Application No. 2020-521454, with English translation, five pages.
Japanese Notice of Allowance mailed Feb. 19, 2024, for JP Application No. 2022-523600, with English translation, six pages.
Japanese Office Action mailed Jan. 26, 2024, for JP Application No. 2022-194759, with English translation, nine pages.
Audfray, R. et al. (2018). "Practical Realization of Dual-Shelving Filter Using Proportional Parametric Equalizers," Audio Eng. Society 145th Convention, Paper 10054, Oct. 17-20, 2018, New York, NY, seven pages.
Audfray, R. et al. (2019). "Headphone Technology," 2019 AES International Conference, Aug. 27-29, 2019, San Francisco, CA, Powerpoint presentation, 28 slides.
Australian Notice of Acceptance dated Apr. 6, 2023, for AU Application No. 2018353008, three pages.
Australian Office Action dated Oct. 4, 2022, for AU Application No. 2018353008, three pages.
Avendano, C. (Jun. 2002). "Frequency Domain Techniques for Stereo to Multichannel Upmix," Audio Eng. Society, 22nd International Conf. for Virtual, Synthetic, and Entertainment Audio, 10 pages.
Avendano, C. et al. (Apr. 2002). "Ambience Extraction and Synthesis from Stereo Signals for Multi-channel Audio Up-mix," IEEE ICASSP (International Conf. Acoustics, Speech and Signal Processing), pp. II-1957-II-1960.
Avendano, C. et al. (Jul./Aug. 2004). "A Frequency-Domain Approach to Multichannel Upmix," Journal of the Audio Engineering Society 52:7/8, 12 pages.
Chinese Notice of Allowance dated May 7, 2022, for CN Application No. 201880067405.3, with English translation, 4 pages.
Chinese Office Action dated Apr. 20, 2022, for CN Application No. 201980012962.X, with English translation, 13 pages.
Chinese Office Action dated Dec. 21, 2022, for CN Application No. 201980012962.X, with English translation, 17 pages.
Chinese Office Action dated Feb. 15, 2022, for CN Application No. 201880067405.3, with English translation, 4 pages.
Chinese Office Action dated Jan. 24, 2022, for CN Application No. 201980012962.X, with English translation, 16 pages.
Chinese Office Action dated May 25, 2021, for CN Application No. 201980012962.X, with English translation, 16 pages.
Chinese Office Action dated Sep. 18, 2021, for CN Application No. 201880067405.3, with English translation, 12 pages.
Dahl, L. et al. (Dec. 2000). "A Reverberator Based on Absorbent All-Pass Filters," Proceedings of the COST G-6 Conference on Digital Audio Effects (DAFX-00), Verona, Italy, Dec. 7-9, 2000, six pages.
European Office Action dated Dec. 8, 2022, for EP Application No. 18867954.2, eight pages.
European Office Action dated Mar. 20, 2023, for EP Application No. 19754505.6, eight pages.
European Search Report dated Mar. 10, 2021, for EP Application No. 19754505.6, eleven pages.
European Search Report dated Nov. 10, 2020, for EP Application No. 18867954.2, twelve pages.
European Search Report dated Nov. 24, 2022, for EP Application No. 20880077.1, nine pages.
Ex Parte Quayle Office Action mailed Nov. 8, 2021, for U.S. Appl. No. 17/079,212, filed Oct. 23, 2020, 12 pages.
Final Office Action mailed Oct. 6, 2021, for U.S. Appl. No. 16/970,331, filed Aug. 14, 2020, nine pages.
Final Office Action mailed Sep. 7, 2023, for U.S. Appl. No. 17/089,593, filed Nov. 4, 2020, eight pages.
Funkhouser, T. et al. (2003). "Survey of Methods for Modeling Sound Propagation in Interactive Virtual Environment Systems," Presence 53 pages.
Funkhouser, T. et al. (Jul. 2002). "Sounds Good to Me! Computational Sound for Graphics, VR, and Interactive Systems," SIGGRAPH Course Notes, 43 pages.
Goodwin, M. M. et al. (Mar. 2007). "Multichannel Surround Format Conversion and Generalized Upmix," 30th International Conf. Audio Engineering Society, Saarislka, Finland, Mar. 15-17, 2007, nine pages.
Goodwin, M. M. et al. (May 2006). "A Frequency-domain Framework for Spatial Audio Coding Based on Universal Spatial Cues," Convention Paper 6751, Audio Engineering Society, 120th Conv., Paris, France, May 20-23, 2006, 12 pages.
Goodwin, M. M. et al. (Oct. 2006). "Analysis and Synthesis for Universal Spatial Audio Coding," Convention Paper 6874, Audio Engineering Sciety, 121st Conv., San Francisco, California, Oct. 5-8, 2006, 11 pages.
Goodwin, M. M. et al. (Oct. 2007). "Binaural 3-D Audio Rendering Based on Spatial Audio Scene Coding," Convention Paper 7277, Audio Engineering Society, 123rd Conv., New York, New York, Oct. 5-8, 2007, 12 pages.
Goodwin, M.M. et al. (Apr. 2007). "Primary-Ambient Signal Decomposition and Vector-Based Localization for Spatial Audio Coding and Enhancement," Proc. IEEE ICASSP (2007 International Conf. on Acoustics, Speech and Signal Processing), pp. 1-9-1-12.
Goodwin, M.M. et al. (Oct. 2008). "Spatial Audio Scene Coding," Convention Paper 7507, Audio Engineering Society, 125th Convention, San Francisco, California, Oct. 2-5, 2008, eight pages.
Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf , 22 pages.
Indian Office Action dated Apr. 22, 2022, for IN Application No. 202047020450, with English translation, 7 pages.
International Preliminary Report on Patentability and Written Opinion, mailed May 5, 2022, for PCT Application No. PCT/US2020/057203, filed Oct. 23, 2020, six pages.
International Preliminary Report on Patentability dated Aug. 18, 2020, for PCT Application No. PCT/US2019/18368, filed Feb. 15, 2019, five pages.
International Preliminary Report on Patentability mailed Apr. 30, 2020, for PCT Application No. PCT/US2018/056385, eleven pages.

(56) References Cited

OTHER PUBLICATIONS

International Search Report and Written Opinion, mailed Jan. 26, 2021, for PCT Application No. PCT/US2020/057203, filed Oct. 23, 2020, eleven pages.
International Search Report and Written Opinion, mailed May 8, 2019, for PCT Application No. PCT/US2019/18368, filed Feb. 15, 2019, eleven pages.
International Search Report mailed Jan. 3, 2019, for PCT Patent Application No. PCT/US2018/056385, filed Oct. 17, 2018, three pages.
Israeli Notice of Acceptance dated Jun. 18, 2023, for IL Application No. 276510, four pages.
Israeli Notice of Allowance dated Jul. 13, 2022, for IL Application No. 273755, three pages.
Israeli Notice of Allowance dated Jun. 29, 2023, for IL Application No. 297445 four pages.
Israeli Office Action dated Feb. 14, 2023, for IL Application No. 276510, four pages.
Jacob, R. "Eye Tracking in Advanced Interface Design", Virtual Environments and Advanced Interface Design, Oxford University Press, Inc. (Jun. 1995).
Japanese Final Office Action mailed Jan. 11, 2023, for JP Application No. 2020-521454, with English translation, 8 pages.
Japanese Final Office Action mailed Jul. 10, 2023, for JP Application No. 2020-543327, with English translation, 14 pages.
Japanese Office Action mailed Jan. 10, 2023, for JP Application No. 2020-543327, with English translation, 11 pages.
Japanese Office Action mailed Oct. 4, 2022, for JP Application No. 2020-521454, with English translation, 9 pages.
Japanese Office Action mailed Sep. 26, 2023, for JP Application No. 2020-521454, with English translation, 16 pages.
Johnston, J.D. et al. (Nov. 2010). "Beyond Coding—Reproduction of Direct and Diffuse Sounds in Multiple Environments," Convention Paper 8314, 129th Conv. Audio Eng. Soc., San Francisco, California, Nov. 4-7, 2010, nine pages.
Jost, A. et al. (Dec. 2000). "Transaural 3-D Audio With User-Controlle Calibration," Proceedings of the Cost G-6 Conference on Digital Audio Effects (DAFX-00), Verona, Italy, Dec. 7-9, 2000, six pages.
Jot, J-M. (Oct. 2012). "Object-Based Audio Content Authoring and Distribution for Interactive and Linear Soundtracks," 133rd Conv. Audio Engineering Society, 12 pages.
Jot, J-M. et al. (May 2003). "Spatial Enhancement of Audio Recordings," AES 23rd International Conference, Copenhagen, Denmark, May 23-25, 2003, 2003, 11 pages.
Jot, J-M. et al. (Oct. 2007). "Spatial Audio Scene Coding in a Universal Two-Channel 3-D Stereo Format," Convention Paper 7276, Audio Engineering Society, 123rd Conv., New York, New York, Oct. 5-8, 2007, 15 pages.
Jot, J-M. (2000). "Proposal for 1A-SIG 3D Audio Rendering Guideline Level 3 (I3DL3)," IA-SIG 3D Audio Workgroup Meeting, Powerpoint presentation, 13 pages.
Jot, J-M. (Apr. 2012). "Enhancing the 3D TV Experience through Next-Generation 3D Audio Coding and Processing Technology," NAB Broadcast Engineering Conf. listing of presentations only, one page.
Jot, J-M. (Apr. 2017). "New Immersive and Object-Based Multichannel Audio Formats for Cinema, Entertainment and Cinematic VR," IEEE SPS Chapter Talk.
Jot, J-M. (Apr. 7, 2014). "Object-Based Immersive Audio for Next-Generation Boradcast," NAB Broadcast Engineering Conf., 26 pages.
Jot, J-M. (Aug. 2018). "Unleashing Wearable 3D Audio," Audio Eng. Soc. Conference on Audio for Virtual and Augmented Reality, 37 pages.
Jot, J-M. (Dec. 2000). "Efficient Models for Interactive Environmental Audio Spatialization," DAFx International Conf. Digital Audio Effects, 22 pages.
Jot, J-M. (Dec. 2012). "Interactive 3D Audio Rendering in Flexible Playback Configurations," IEEE APSIPA Conf., nine pages.
Jot, J-M. (Feb. 2000). "Advanced Audio BIFS: Environmental Spatialization of Audio in MPEG-4, version 2," Audio Engineering Society, 108th Conv., Presentation, 17 pages.
Jot, J-M. (Feb. 2011). "Next-Generation 3-D Audio—Creation, Transmission and Reproduction," ATSC Symposium on Next Generation Broadcast Television, 20 pages.
Jot, J-M. (Feb. 2016). "Environmental Audio Effects in Games, VR and AR," Audio Eng. Soc., 61st Conf.—Audio for Games, Paragraph located on p. 7, and located at http://www.aes.org/conferences/61/schedule.cfm,last visited on Oct. 23, 2018, 10 pages.
Jot, J-M. (Feb. 2017). "Augmented Reality Headphone Reverberation," DSP Seminar at CCRMA, Stanford Univ, Palo Alto, CA., Abstract Only, one page.
Jot, J-M. (Jan. 1999) "Real-Time Spatial Processing of Sounds for Music, Multimedia and Interaction Human-Computer Interfaces," ACM Multimedia Systems, 7:55-69.
Jot, J-M. (Jan. 2008). "Prospects in Format-Agnostic Spatial Audio," 2nd International SpACE-Net Spatial Audio Workshop, list of presentations, 4 pages.
Jot, J-M. (Jun. 2018). "Towards 6-DoF XR Audio," Immersive Experience IX Symposium, 11 pages.
Jot, J-M. (Jun. 27, 2014). "Next-Generation Immersive Audio Content Standard and Consumer Format," IEEE International Symposium on Broadband Multimedia Systems and Broadcasting, 24 pages.
Jot, J-M. (Mar. 1992) "An Analysis/Synthesis Approach to Real-Time Artificial Reverberations," IEEE ICASSP International Conference on Acoustics, Speech and Signal Processing, San Francisco, CA, Mar. 23-26, 1992, pp. 11-221-11-224.
Jot, J-M. (Mar. 2015). "DTS:X Next-Generation Consumer Audio Delivery Solution," AES 57th Conf. on the Future of Audio Entertainment Technology, 16 pages.
Jot, J-M. (Mar. 2015). "Integrating Object-, Scene-, and Channel-Based Immersive Audio for Delivery to the Home," AES 57th Conf. on the Future of Audio Entertainment Technology, presentation Workshop 2 p.m . . . , p. 5, 5 pages.
Jot, J-M. (May 2001). "Perceptual and Statistical Models for Virtual Environments." ACM Campfire: Acoustic Rendering for Virtual Environments, Preconference Proceedings, Snowbird, Utah, May 26-29, 2001, 10 pages.
Jot, J-M. (Nov. 18, 2013). "MDA—an Open Content Format for Next-Generation Immersive Audio," Forum International du Son Multicanal, 29 pages.
Jot, J-M. (Nov. 2012). "Multichannel 3D Audio Encoding and Reproduction," Forum International du Son Multicanal, 21 pages.
Jot, J-M. (Oct. 2007). "Efficient Description and Rendering of Complex Interactive Acoustic Scenes," Proc. of the 10th Int. Conference on Digital Audio Effects (DAFx-07), Bordeaux, France, Sep. 10-15, 2007, two pages.
Jot, J-M. (Oct. 2008). "Two-Channel Matrix Surround Encoding for Flexible Interactive 3-D Audio Reproduction," Convention Paper 7552, Audio Engineering Society, 125th Conv. San Francisco, California, Oct. 2-5, 2008, 13 pages.
Jot, J-M. (Oct. 2015). "Immersive Audio Processing and Effects for Games," 139th Conv. Audio Engineering Society, 25 pages.
Jot, J-M. (Oct. 2017). "Room-Adaptive Headphone 3D Audio," Audio Engineering Society, 143rd Conv.New York, New York, 23 pages.
Jot, J-M. (Oct. 9, 2013). "Object-Based Immersive Audio Content Format for Next-Generation Broadcast," IEEE Broadcast Symposium, 18 pages.
Jot, J-M. (Sep. 1997). "Efficient Models for Reverberation and Distance Rendering in Computer Music and Virtual Audio Reality," ICMC International Computer Music Conf., eight pages.
Jot, J-M. (Sep. 2017). "Efficient Reverberation Rendering for Complex Interactive Audio Scenes," DAFx 20th International Conf. Digital Audio Effects, 58 pages.
Jot, J-M. et al. (1995). "Le Spatialisateur," GRAME Conf. "Le Son et L'Espace." French only, seven pages.
Jot, J-M. et al. (2006). "Spatialisateur—Introduction," IRCAM (1995, revised 2006.).

(56) References Cited

OTHER PUBLICATIONS

Jot, J-M. et al. (2012). "Spatialisateur—Introduction," IRCAM (1995, revised 2012.) Located at http://web4.ircam.fr/transmission.html?event=1021&L=1 . . . , last visited Oct. 23, 2018, two pages.
Jot, J-M. et al. (Feb. 1991). "Digital Delay Networks for Designing Artificial Reverberators," Audio Engineering Society, 90th Conv., Paris, France, Feb. 19-22, 1991, 17 pages.
Jot, J-M. et al. (Feb. 1995). "Digital Signal Processing Issues in the Context of Binaural and Transaural Stereophony," Audio Engineering Society, 98th Conv., Paris, France, Feb. 25-28, 1995, 47 pages.
Jot, J-M. et al. (Jun. 2016). "MDA—Open Standard for Immersive Audio Content Creation and Distribution," Immersive Experience IX Symposium, 33 pages.
Jot, J-M. et al. (Mar. 1999). "A Comparative Study of 3-D Audio Encoding and Rendering Techniques," Audio Eng. Society, 16th International Conf., 20 pages.
Jot, J-M. et al. (May 1995). "Spat~: a Spatial Processor for Musicians and Sound Engineers," CIARM'95 Conference, Ferrara (Italy) 1995, six pages.
Jot, J-M. et al. (May 2006). "Scene Description Model and Rendering Engine for Interative Virtual Acoustics," Convention Paper 6660, Audio Engineering Society, 120th Conv., Paris, Francs, May 20-23, 2006, 13 pages.
Jot, J-M. et al. (May 2010). "Center-Channel Processing in Virtual 3-D," Convention Paper 8116, Audio Engineering Society, 128th Conv., London, UK, May 22-25, 2010, 10 pages.
Jot, J-M. et al. (Oct. 1993). "Biaural Concert Hall Simulation in Real Time," IEEE Workshop on Applications of Digital Signal Processing to Audio and Acoustics. Located at: http://architexte.ircam.fr/textes/Jot93a/index.html, last visited Oct. 15, 2018, 17 pages.
Jot, J-M. et al. (Oct. 2006). "Binaural Simulation of Complex Acoustic Scenes for Interactive Audio," Convention Paper 6950, Audio Engineering Society, 121st Conv., San Francisco, California, Oct. 5-8, 2006, 20 pages.
Jot, J-M. et al. (Oct. 2011). "Beyond Surround Sound-Creation, Coding and Reproduction of 3-D Audio Soundtracks," Convention Paper 8463, Audio Engineering Society, 131st. Conv., New York, New York, Oct. 20-23, 2011, 11 pages.
Jot, J-M. et al. (Oct. 2015). "Dialog Control and Enhancement in Object-Based Audio Systems," Convention Paper 9356, Audio Engineering Society, 139th Conv., New York, New York, Oct. 29-Nov. 1, 2015, seven pages.
Jot, J-M. et al. (Oct. 2016). "Augmented Reality Headphone Environment Rendering," Audio Eng. Soc. Conf. on Audio for Virtual and Augmented Reality, Los Angeles, California, Sep. 30-Oct. 1, 2016, six pages.
Jot, J-M. et al. (Oct. 2017). "Efficient Structures for Virtual Immersive Audio Processing," Convention paper 9865, Audio Engineering Society, 143rd Conv. Presented in New York, New York, Oct. 18-21, 2017, eight pages.
Jot, J-M. et al. (Sep. 1997). "Analysis and Synthesis of Room Reverberation Based on a Statistical Time-Frequency Model," Audio Engineering Society, 103rd Convention, 31 pages.
Jot, J-M. et al. (Sep. 1998). "Approaches to Binaural Synthesis," Audio Engineering Society, 105th Conv., San Francisco, California, Sep. 26-29, 1998, 14 pages.
Jot, J-M. et al. (Sep. 20, 1999). "Interactive 3-D Audio Rendering Guidelines Level 2.0," Interactive Audio Special Interest Group, 29 pages.
Korean Office Action dated May 18, 2023, for KR Application No. 10-2020-7013593, with English translation, 5 pages.
Korean Office Action dated Oct. 31, 2022, for KR Application No. 10-2020-7013593, with English translation, 14 pages.
Larcher, V. et al. (Feb. 2000). "Study and Comparison of Efficient Methods for 3D Audio Spatialization Based on Linear Decomposition of HRTF Data," Audio Engineering Society, 108th Conv., Paris, France, Feb. 19-22, 2000; 30 pages.
Larcher, V. et al. (Sep. 1998). "Equalization Methods in Binaural Technology," Audio Engineering Society, 105th Conv. San Francisco, California, Sep. 26-29, 1998, 29 pages.
Larcher, V. et al. (Sep. 2001). "Individualization of HRTF by Spectral Warping," International Congress on Acoustics, 3 pages.
Laroche, J. et al. (Apr. 1992). "Analysis/Synthese of Quasi-Harmonic Sounds by Use of the Karplus-Strong Algorithm," 2nd French Congress on Acoustics, Journal de Physique IV, Colloque C1, Supplement au Journal de Physique III, 2:C1-117-C1-120 (five pages.).
Marin, M. et al. (May 1994). "Environment de Simulation pour l'Evaluation Psychoacoustique des Systemes de Prise et de Restitution du Son dans un Contexte de Teleconference," 3rd French Congress on Acoustics, five pages.
Merimaa, J. et al. (Oct. 2007). "Correlation-Based Ambience Extraction from Stereo Recordings," Convention Paper 7282. Audio Eng. Society, 123rd Conv., New York, New York, Oct. 5-8, 2007, 15 pages.
Murgai, P. et al. (Oct. 2017). "Blind Estimation of the Reverberation Fingerprint of Unknown Acoustic Environments," Convention Paper 9905, Audio Engineering Society, 143rd Conv. New York, New York, Oct. 18-21, 2017, six pages.
Non-Final Office Action mailed Apr. 2, 2020, for U.S. Appl. No. 16/803,301, filed Feb. 27, 2020, seven pages.
Non-Final Office Action mailed Apr. 27, 2023, for U.S. Appl. No. 17/943,057, filed Sep. 12, 2022, five pages.
Non-Final Office Action mailed Aug. 7, 2019, for U.S. Appl. No. 16/163,529, filed Oct. 17, 2018, 12 pages.
Non-Final Office Action mailed Feb. 16, 2022, for U.S. Appl. No. 16/970,331, filed Aug. 14, 2020, eleven pages.
Non-Final Office Action mailed Jun. 14, 2021, for U.S. Appl. No. 16/970,331, filed Aug. 14, 2020, nine pages.
Non-Final Office Action mailed Mar. 8, 2023, for U.S. Appl. No. 18/058,232, filed Nov. 22, 2022, six pages.
Non-Final Office Action mailed May 4, 2023, for U.S. Appl. No. 17/089,593, filed Nov. 4, 2020, eight pages.
Notice of Allowance mailed Aug. 10, 2022, for U.S. Appl. No. 16/970,331, filed Aug. 14, 2020, eight pages.
Notice of Allowance mailed Aug. 21, 2023, for U.S. Appl. No. 17/943,057, filed Sep. 12, 2022, seven pages.
Notice of Allowance mailed Feb. 7, 2022, for U.S. Appl. No. 17/079,212, filed Oct. 23, 2020, 5 pages.
Notice of Allowance mailed Jul. 27, 2023, for U.S. Appl. No. 18/058,232, filed Nov. 22, 2022, eight pages.
Notice of Allowance mailed May 4, 2020, for U.S. Appl. No. 16/803,301, filed Feb. 27, 2020, five pages.
Notice of Allowance mailed Nov. 27, 2019, for U.S. Appl. No. 16/163,529, filed Oct. 17, 2018, 9 pages.
Notice of Allowance mailed Oct. 19, 2022, for U.S. Appl. No. 17/686,025, filed Mar. 3, 2022, eight pages.
Pernaux, J-M. et al. (Nov. 1998). "Virtual Sound Source Positioning and Mixing in 5.1 Implementation on the Real-Time System Genesis," DAFx International Conf. Digital Audio Effects, five pages.
Ravish, Mehra et al: "WAVE: Interactive Wave-based Sound Propagation for Virtual Environments," IEEE Transactions on Visualization and Computer Graphics, IEEE Service Center, Los Alamitos, CA, US, vol. 21, No. 4, Apr. 18, 2015 (Apr. 18, 2015), pp. 434-442, retrieved on Mar. 20, 2015.
Rolland, J. et al., "High-resolution inset head-mounted display", Optical Society of America, vol. 37, No. 19, Applied Optics, (Jul. 1, 1998).
Savioja, L. et al.: "Creating interactive virtual acoustic environments," Journal of the audio engineering society, audio engineering society, New York, NY, US, vol. 47, No. 9, Sep. 1, 1999 (Sep. 1, 1999), pp. 675-705, XP000927390, ISSN: 1549-4950, Chapters 2, 4; p. 691-p. 692; figure 19.
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Thompson, J. et al. (Oct. 2012). "Direct-Diffuse Decomposition of Multichannel Signals Using a System of Pairwise Correlations,"

(56) References Cited

OTHER PUBLICATIONS

Convention Paper 8807, Audio Engineering Society, 133rd Conv. San Francisco, California, Oct. 26-29, 2012, 15 pages.
Trivi, J-M. et al. (Aug. 2002). "Rendering MPEG-4 AABIFS Content Through a Low-Level Cross-Platform 3D Audio API," IEEE ICME International Conf. Multimedia & Expo., pp. 513-516.
Walker, Robert : "A Simple Acoustic Room Model for Virtual Production," Internet Citation, Jun. 7, 1999 (Jun. 7, 1999), pp. 48-72, Retrieved from the Internet: URL:http://www.aes.org/tmpFiles/elib/20100211/7978.pdf, on Feb. 11, 2010, 30 pages.
Walsh, M. et al. (May 2011). "Adaptive Dynamics Enhancement," Convention Paper 8343, Audio Engineering Society, 130th Conv., London, UK May 13-16, 2011, 10 pages.
Walsh, M. et al. (Oct. 2006). "Loudspeaker-Based 3-D Audio System Design Using the M-S Shuffler Matrix," Convention Paper 6949, Audio Engineering Society, 121st. Conv., San Francisco, California, Oct. 5-8, 2006, 17 pages.
Yoshida, A. et al., "Design and Applications of a High Resolution Insert Head Mounted Display", (Jun. 1994).
Canadian Notice of Allowance dated Mar. 18, 2024, for CA Application No. 3,090,390, one page.
Canadian Notice of Allowance dated Mar. 5, 2024, for CA Application No. 3,078,420, one page.
Israeli Notice of Acceptance dated Feb. 26, 2024, for IL Application No. 305799, three pages.
Examination Report dated May 1, 2024, for NZ Application No. 763667, two pages.
Japanese Office Action mailed Jun. 12, 2024, for JP Application No. 2023-214712, with English translation, 11 pages.
Japanese Office Action mailed May 16, 2024, for JP Application No. 2023-063331, with English translation, five pages.
Korean Office Action dated Jun. 20, 2024, for KR Application No. 10-2024-7003741, with English translation, five pages.
Non-Final Office Action mailed May 17, 2024, for U.S. Appl. No. 18/237,803, filed Aug. 24, 2023, six pages.
Japanese Notice of Allowance mailed Aug. 16, 2024, for JP Application No. 2020-543327, with English translation, 5 pages.
Japanese Office Action mailed Jul. 26, 2024, for JP Application No. 2022-194759, with English translation, 10 pages.

* cited by examiner

MIXED REALITY VIRTUAL REVERBERATION

CROSS-REFERENCE TO RELATED APPLICATION

This application is a continuation of U.S. application Ser. No. 17/943,057, filed Sep. 12, 2022, which is a continuation of U.S. application Ser. No. 16/970,331, filed Aug. 14, 2020, now U.S. Pat. No. 11,477,510, issued on Oct. 18, 2022, which is a national stage application under 35 U.S.C. § 371 of International Application No. PCT/US2019/18368, filed internationally on Feb. 15, 2019, which claims benefit of U.S. Provisional Patent Application No. 62/631,418, filed Feb. 15, 2018, which are hereby incorporated by reference in their entirety.

FIELD

This disclosure relates in general to systems and methods for presenting audio signals, and in particular to systems and methods for presenting reflected audio signals to a user of a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

XR systems may provide the user with various ways in which to interact with a virtual environment; for example, XR systems may include various sensors (e.g., cameras, microphones, etc.) for detecting a user's position and orientation, facial expressions, speech, and other characteristics; and present this information as input to the virtual environment. Some XR systems may incorporate a sensor-equipped input device, such as a virtual "mallet," and may be configured to detect a position, orientation, or other characteristic of the input device.

XR systems can offer a uniquely heightened sense of immersion and realism by combining virtual visual and audio cues with real sights and sounds. For example, it may be desirable to present audio cues to a user of an XR system in a way that mimics aspects, particularly subtle aspects, of our own sensory experiences. The present invention is directed to presenting, to a user, a reflected audio signal simulating a reflection of a real sound wave (e.g., the user's own voice) against a virtual object in a mixed reality environment. By taking into account the position and orientation of the user relative to the virtual object, and attributes of the virtual object (such as its material properties), the reflected audio signal can simulate the reflection that would be heard by a user if the virtual object were a real object in the user's environment. By using virtual objects to present audio cues that are faithful to the way sound waves behave in the real world, the user may experience a heightened awareness of such virtual objects in the mixed reality environment.

In one example of use, early arriving reflections of the user's own voice from nearby virtual objects (e.g., a virtual book held 20 centimeters from the user's face) are synthesized. In this manner the realism of virtual content in a mixed reality environment can be enhanced. Being virtual, the book cannot physically reflect the user's voice back to the user's ears; but the reflected audio wave that would be produced if the book were real can be computed, and output via one or more speakers, for example coupled to a mixed reality wearable head device.

BRIEF SUMMARY

Examples of the disclosure describe systems and methods for presenting audio signals to a user of a mixed reality environment. In one example, a method comprises the steps of detecting a first audio signal in the mixed reality environment, where the first audio signal is a real audio signal; identifying a virtual object intersected by the first audio signal in the mixed reality environment; identifying a listener coordinate associated with the user; determining, using the virtual object and the listener coordinate, a transfer function; applying the transfer function to the first audio signal to produce a second audio signal; and presenting, to the user, the second audio signal.

DETAILED DESCRIPTION

Figure 1A:
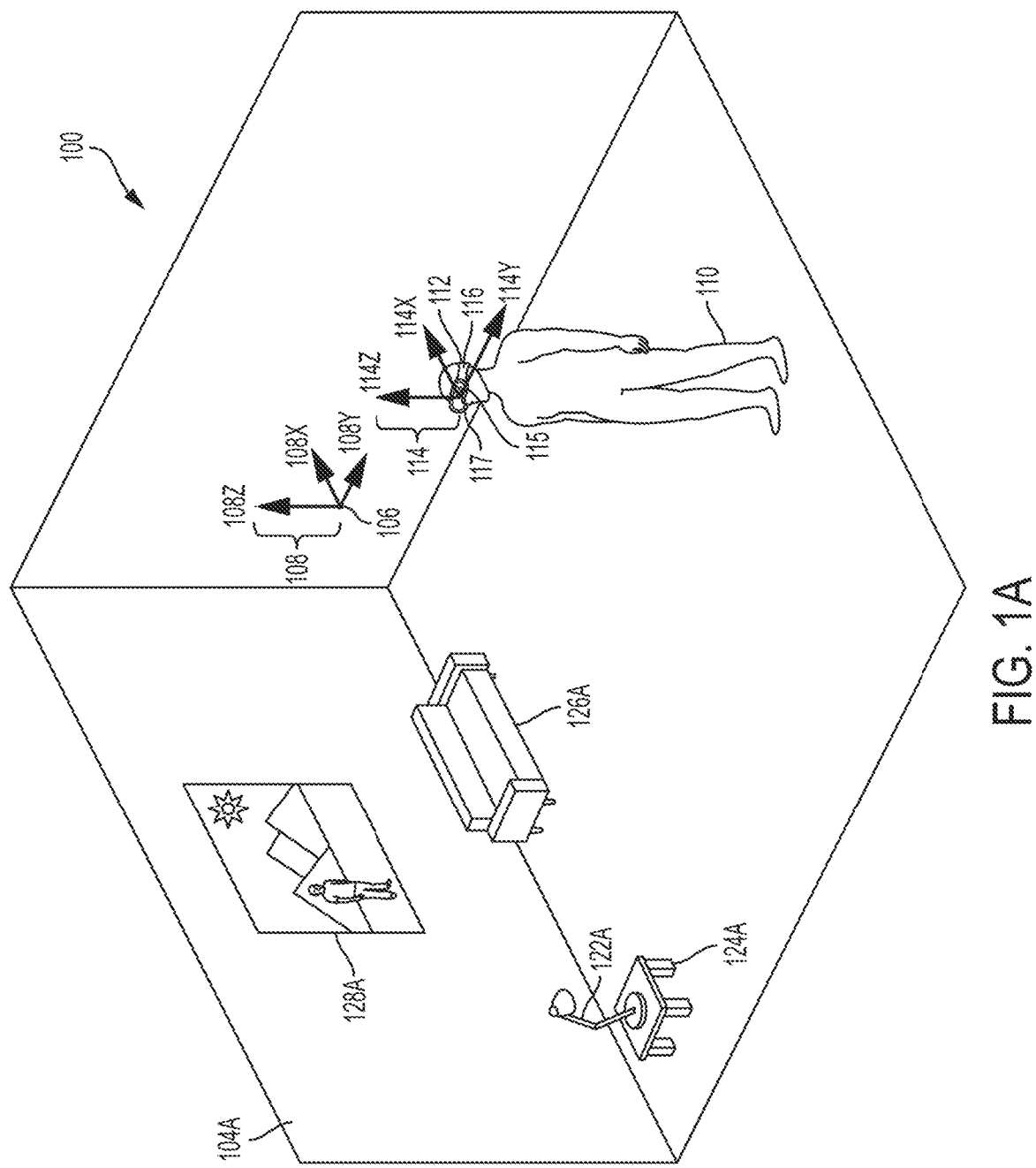
FIGS. 1A-1C illustrates an example mixed reality environment.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
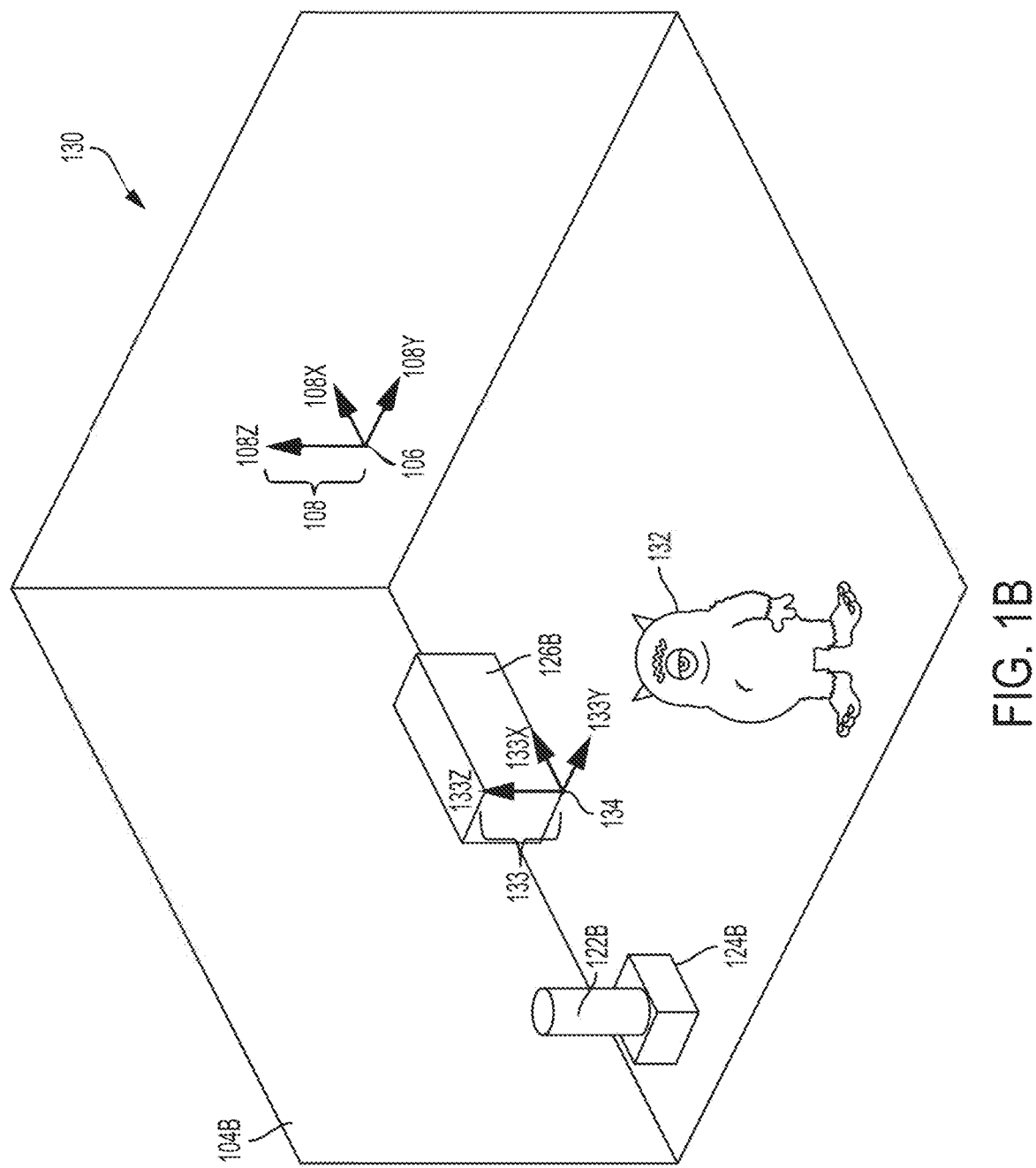

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
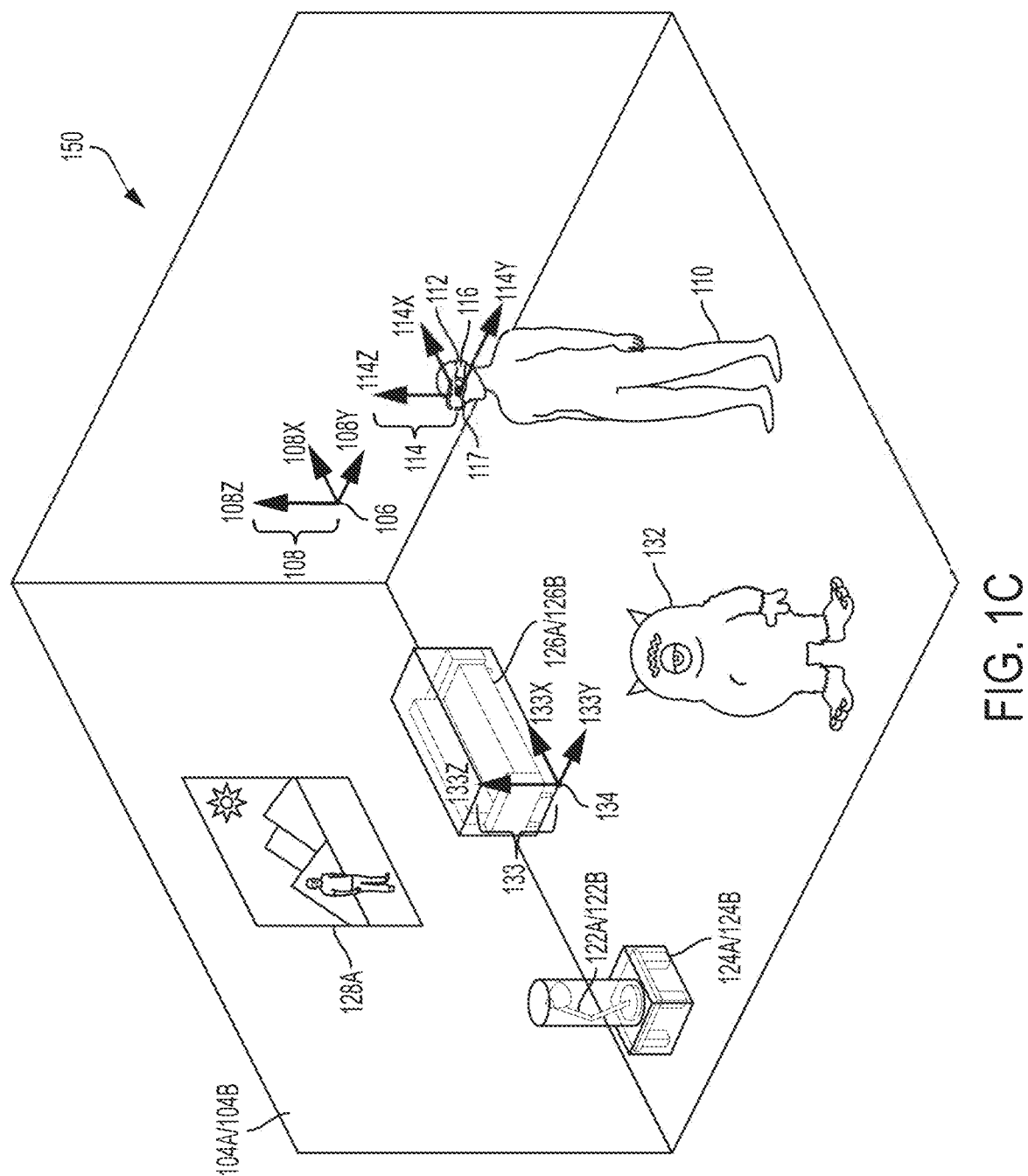

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
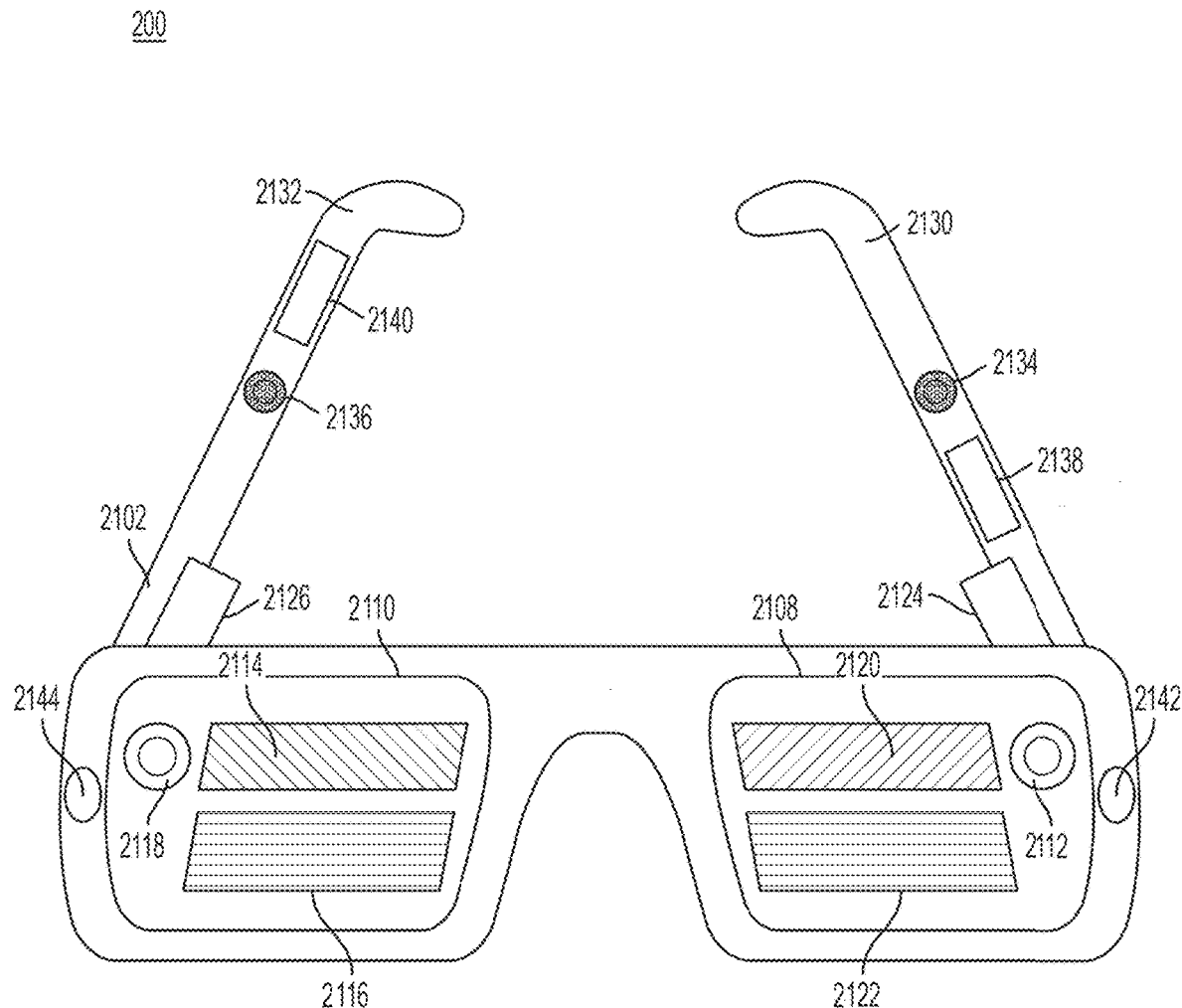
FIGS. 2A-2D illustrate components of an example mixed reality system that can be used to generate and interact with a mixed reality environment.
Figure 2B:
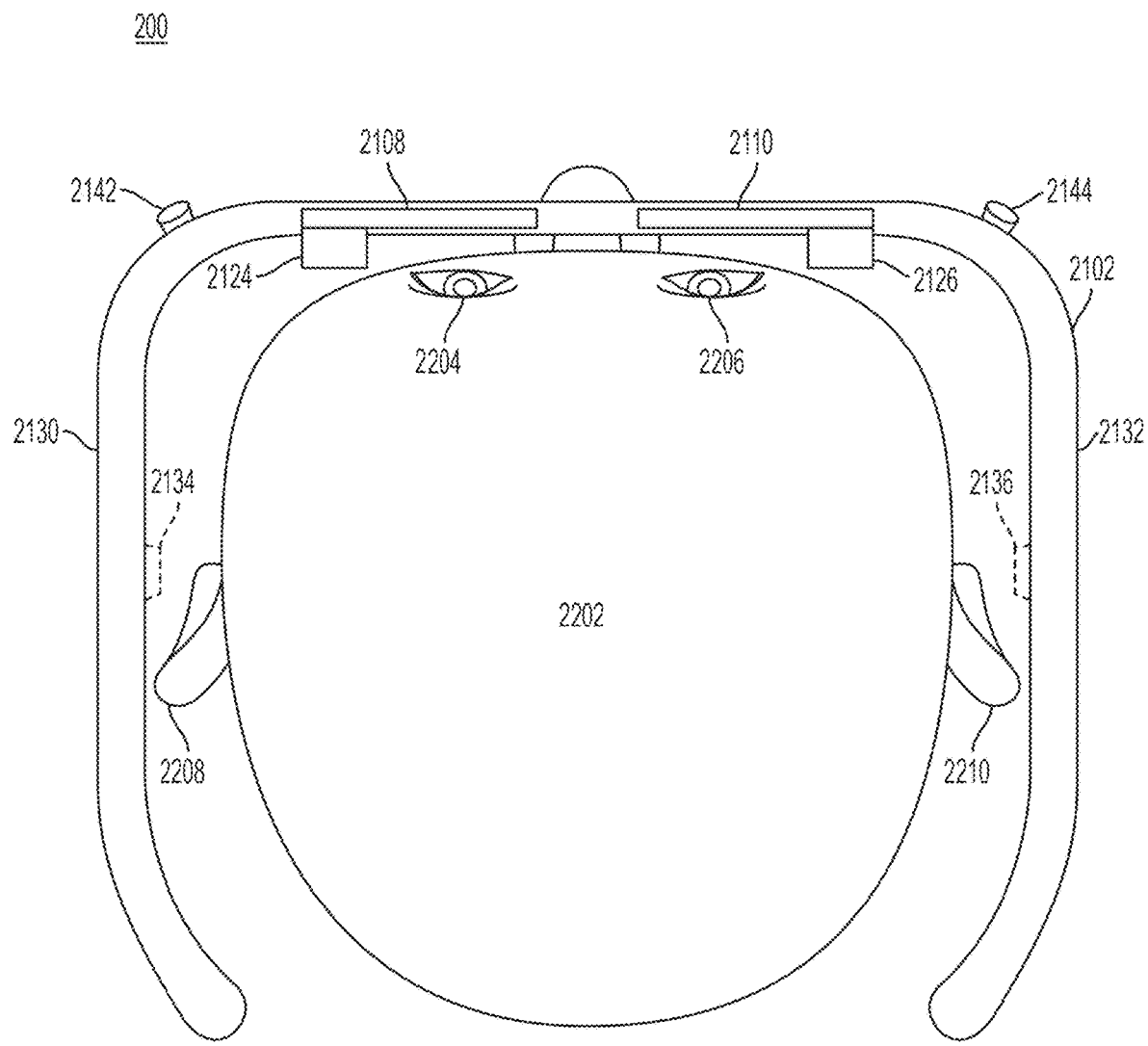
Figure 2C:
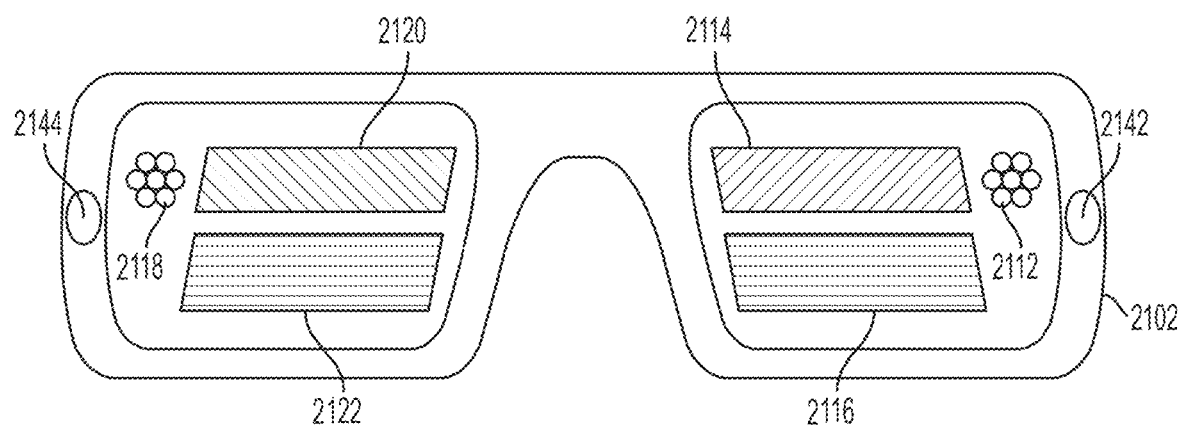
Figure 2D:
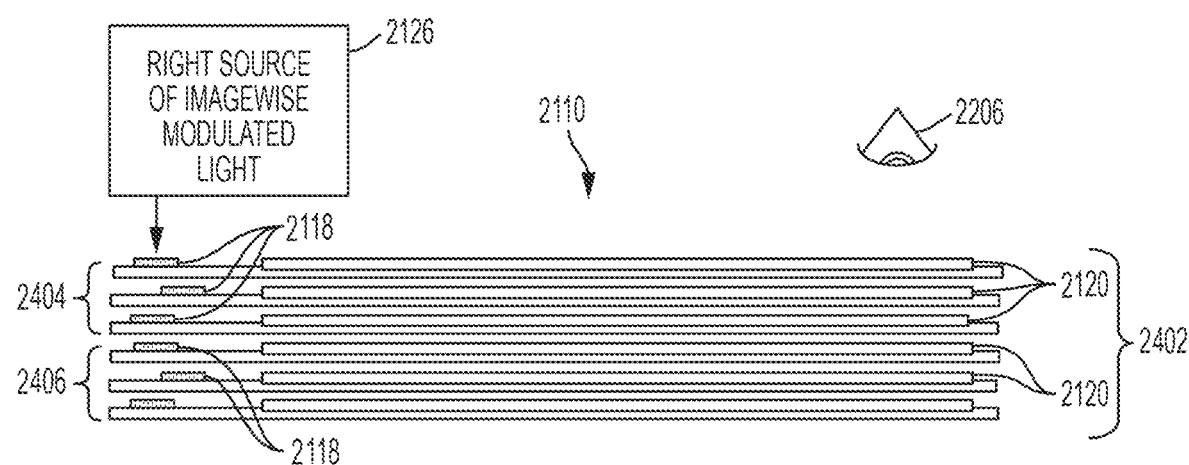

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head device 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus correspondeing the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
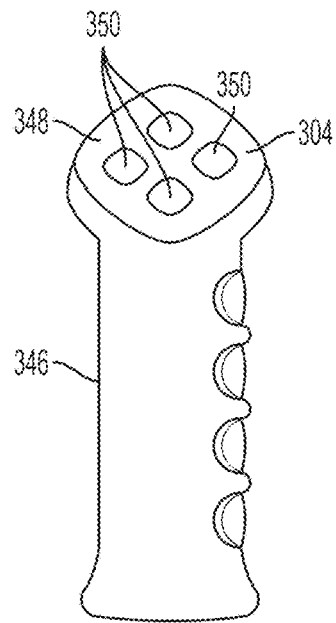
FIG. 3A illustrates an example mixed reality handheld controller that can be used to provide input to a mixed reality environment.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head device (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
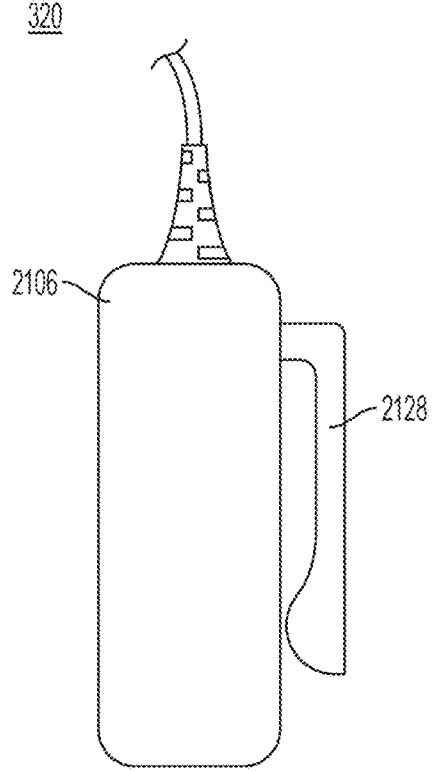
FIG. 3B illustrates an example auxiliary unit that can be included in an example mixed reality system.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
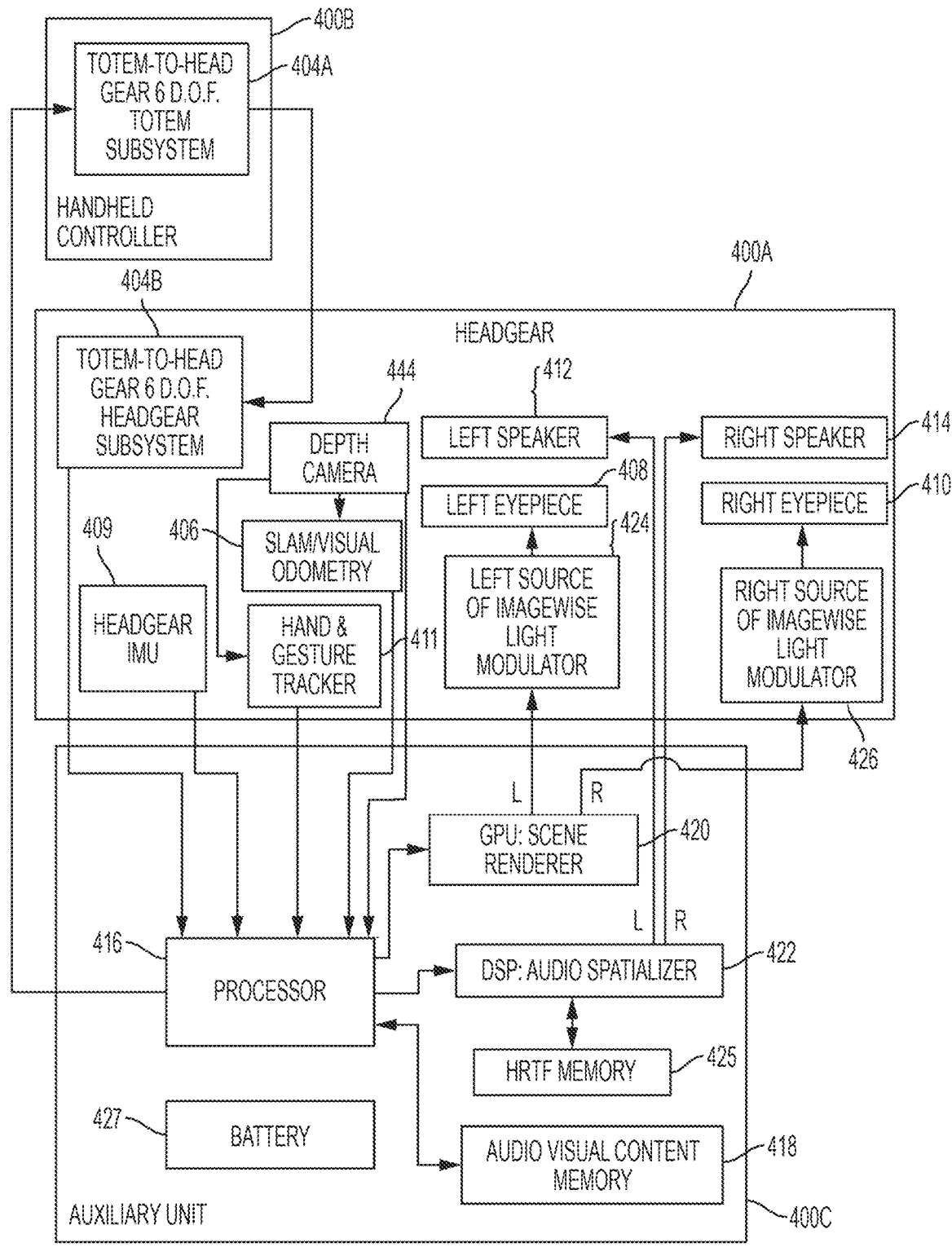
FIG. 4 illustrates an example functional block diagram for an example mixed reality system.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Virtual Reflections

As described above, a MRE (such as experienced via a mixed reality system, e.g., mixed reality system 200 described above) can present audio signals that appear, to a user of the MRE, to originate at a sound source with an origin coordinate in the MRE, and travel in a direction of an orientation vector in the MRE. That is, the user may perceive these audio signals as if they were real audio signals originating from the origin coordinate of the sound source and traveling along the orientation vector.

In some cases, audio signals may be considered virtual in that they correspond to computational signals in a virtual environment, and do not necessarily correspond to real sounds in the real environment. However, virtual audio signals can be presented to a user as real audio signals detectable by the human ear, for example as generated via speakers 2134 and 2136 of wearable head device 2102 in FIGS. 2A-2D.

A sound source may correspond to a real object and/or a virtual object. For example, a virtual object (e.g., virtual monster 132 of FIG. 1C) can emit an audio signal in a MRE, which is represented in the MRE as a virtual audio signal, and presented to the user as a real audio signal. For instance, virtual monster 132 of FIG. 1C can emit a virtual sound corresponding to the monster's speech (e.g., dialogue) or sound effects. Similarly, a real object (e.g., real object 122A of FIG. 1C) can be made to appear to emit a virtual sound in a MRE, which is represented in the MRE as a virtual audio signal, and presented to the user as a real audio signal. For instance, real lamp 122A can emit a virtual sound corresponding to the sound effect of the lamp being switched on or off—even if the lamp is not being switched on or off in the real environment. The virtual sound can correspond to a position and orientation of the sound source (whether real or virtual). For instance, if the virtual sound is presented to the user as a real audio signal (e.g., via speakers 2134 and 2136), the user may perceive the virtual sound as originating from the position of the sound source, and traveling in the direction of the orientation of the sound source. Sound sources are referred to herein as "virtual sound sources," even though the underlying object made to apparently emit a sound may itself correspond to a real object, such as described above.

Some virtual or mixed reality environments suffer from a perception that the environments do not feel real or authentic. One reason for this perception is that audio and visual cues do not always match each other in virtual environments. For example, if a user is positioned behind a large brick wall in a MRE, the user may expect sounds coming from behind the brick wall to be quieter and more muffled than sounds originating right next to the user. This expectation is based on our own auditory experiences in the real world, where sounds may be altered (e.g., may become quiet and muffled) by the presence of large, dense objects. For example, when the user is presented with an audio signal that purportedly originates from behind the brick wall, but that is presented unmuffled and at full volume, the illusion that the user is behind a brick wall—or that the sound originates from behind it—is compromised. The entire virtual experience may feel fake and inauthentic, in part because it does not comport with our own expectations based on real world interactions. Further, in some cases, the "uncanny valley" problem arises, in which even subtle differences between virtual experiences and real experiences can cause feelings of discomfort. It is desirable to improve the user's experience by presenting, in a MRE, audio signals that appear to realistically interact—even in subtle ways with objects in the user's environment. The more consistent that such audio signals are with our own expectations, based on real world experience, the more immersive and engaging the user's MRE experience will be.

Lessons from perceptual science may be useful here. One way that people perceive and understand the environment around them is through audio cues. In the real world, the real audio signals we hear are affected by where those audio signals originate from, in what direction those audio signals travel, and what objects that audio signals interact with. For example, with all other factors equal, a sound that originates a great distance from a listener (e.g., a dog barking in the distance) will appear quieter than the same sound originating from a short distance (e.g., the dog barking in the same room as the listener). A listener can thus identify a location of a dog in the real environment based on the perceived volume of its bark. Likewise, with all other factors equal, a sound that travels away from the listener (e.g., the voice of a person who is facing away from the listener) will appear less clear and more muffled (i.e., low-pass filtered) than the same sound traveling toward the user (e.g., the voice of a person who is facing toward the listener). A listener can thus identify the orientation of a person in the real environment based on the perceived frequency characteristics of that person's voice.

Our perception of real audio signals can also be affected by the presence of objects in the environment, with which audio signals interact. That is, listeners may perceive not only an audio signal generated by a sound source, but also the reverberations of that audio signal against nearby physical objects ("reverb"). For example, if a person speaks in a small room with close walls, those walls may cause short natural reverberated signals to result as the person's voice reflects off of the walls. A listener may infer from those reverberations that he or she is in a small room with close walls. Likewise, a large concert hall or cathedral may cause longer reverberations, from which the listener can infer that he or she is in a large, spacious room. Similarly, reverberations of audio signals may take on various sonic characteristics based on the position or orientation of the surfaces against which those signals reflect, or the material of those surfaces. For example, reverberations against bathroom tile will sound different than reverberations against brick, carpet, drywall, or other materials. These reverberation characteristics can be used by the listener to infer the location, orientation, and material of the objects in his or her vicinity.

The above examples illustrate how audio cues can inform our perception of the environment around us. These cues can act in combination with visual cues: for example, if we see a dog in the distance, we expect the sound of that dog's bark to be consistent with that distance (and may feel disconcerted or disoriented if it is not, as in some virtual environments). In some examples, such as in low-light environments, or with respect to visually impaired users, visual cues may be limited or unavailable; in such cases, audio cues may take on a particular importance, and may serve as the user's primary means of understanding his or her environment.

In some environments—whether real, virtual, mixed, or otherwise—an important source of audio cues is the user's own voice. That is, the sound of a user's own voice in his or her environment can be a particularly important audio cue for understanding that environment. One reason is that the user, as the one speaking, is highly attuned to what his or her own voice will sound like; and deviations from that expectation can be especially valuable as clues to the environment. Another reason is that people may have substantial experience speaking in various physical environments—small rooms, cavernous rooms, tiled bathrooms, etc.—and intuitively understand, from this experience, how those rooms will affect the sound of their own voices.

It is desirable to present audio signals in a MRE to a user in a manner that incorporates realistic reverberation effects, based on virtual objects in the MRE, so that the user can use these audio signals as cues to identify the virtual objects—a problem with which users of some MREs struggle. Incorporating such reverberation effects is further desirable in order to lend the audio signals a more realistic, believable quality by simulating real-world reverberations. This may reduce suboptimal dissonance between the user's auditory experience in the MRE, and the user's auditory experience in the real world, such as where audio signals in the MRE do not seem quite right (the aforementioned uncanny valley problem). Further, it may be particularly desirable for a MRE to apply such effects to the user's own voice, for the reasons noted above. Compared to conventional reverb systems, the present invention can allow for a more nuanced, and believable, presentation of audio signals by taking into account the user's position, orientation, and other characteristics relative to the audio signals and the environment. By presenting a user of a MRE with an audio experience that evokes the audio experiences of our everyday lives, a MRE can enhance the user's feeling of immersion and connectedness when engaging with the MRE.

Figure 5A:
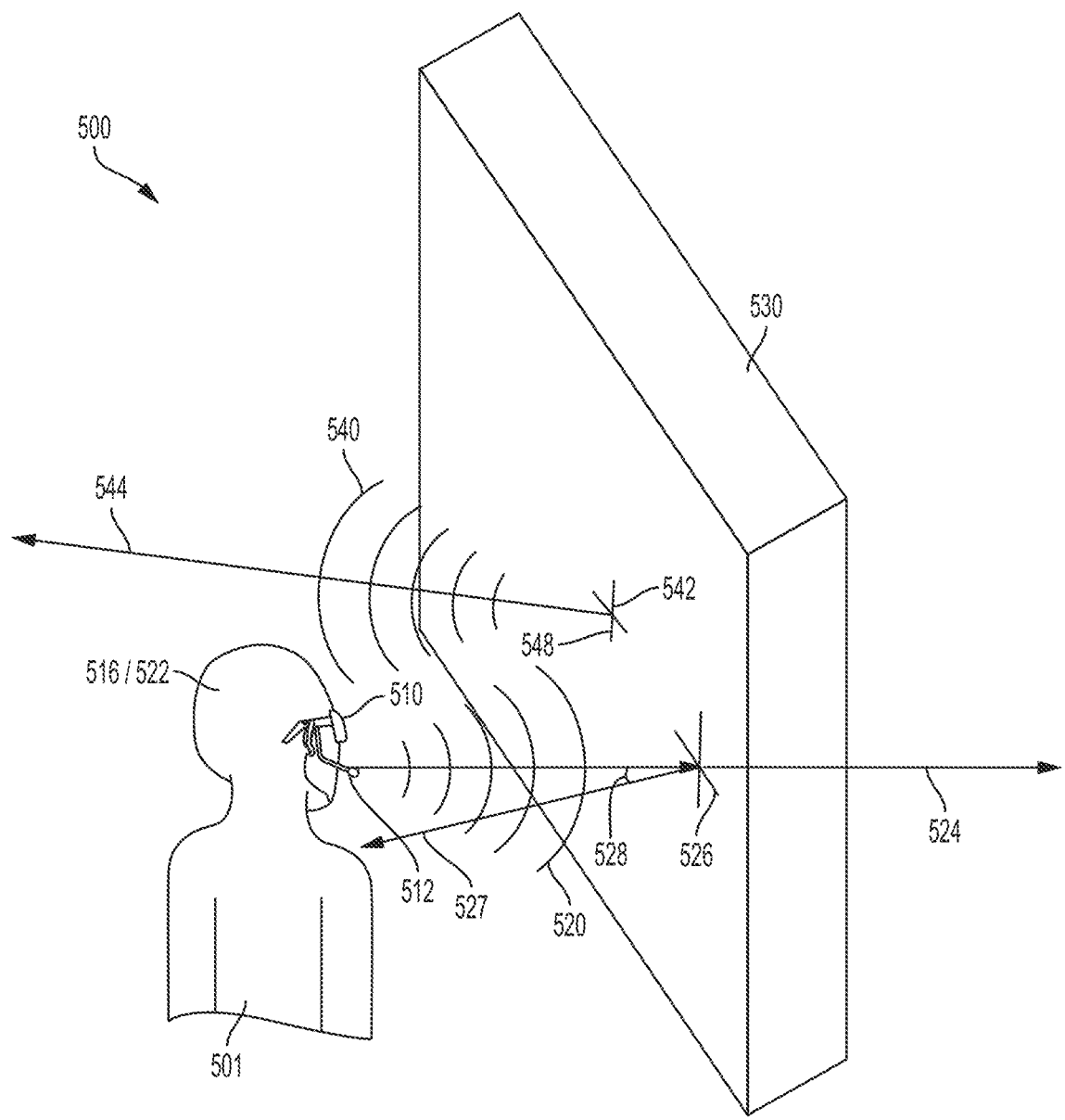
FIGS. 5A-5B illustrate an example mixed reality environment that includes a user, a virtual object, and an audio signal reflected against the virtual object.
Figure 5B:
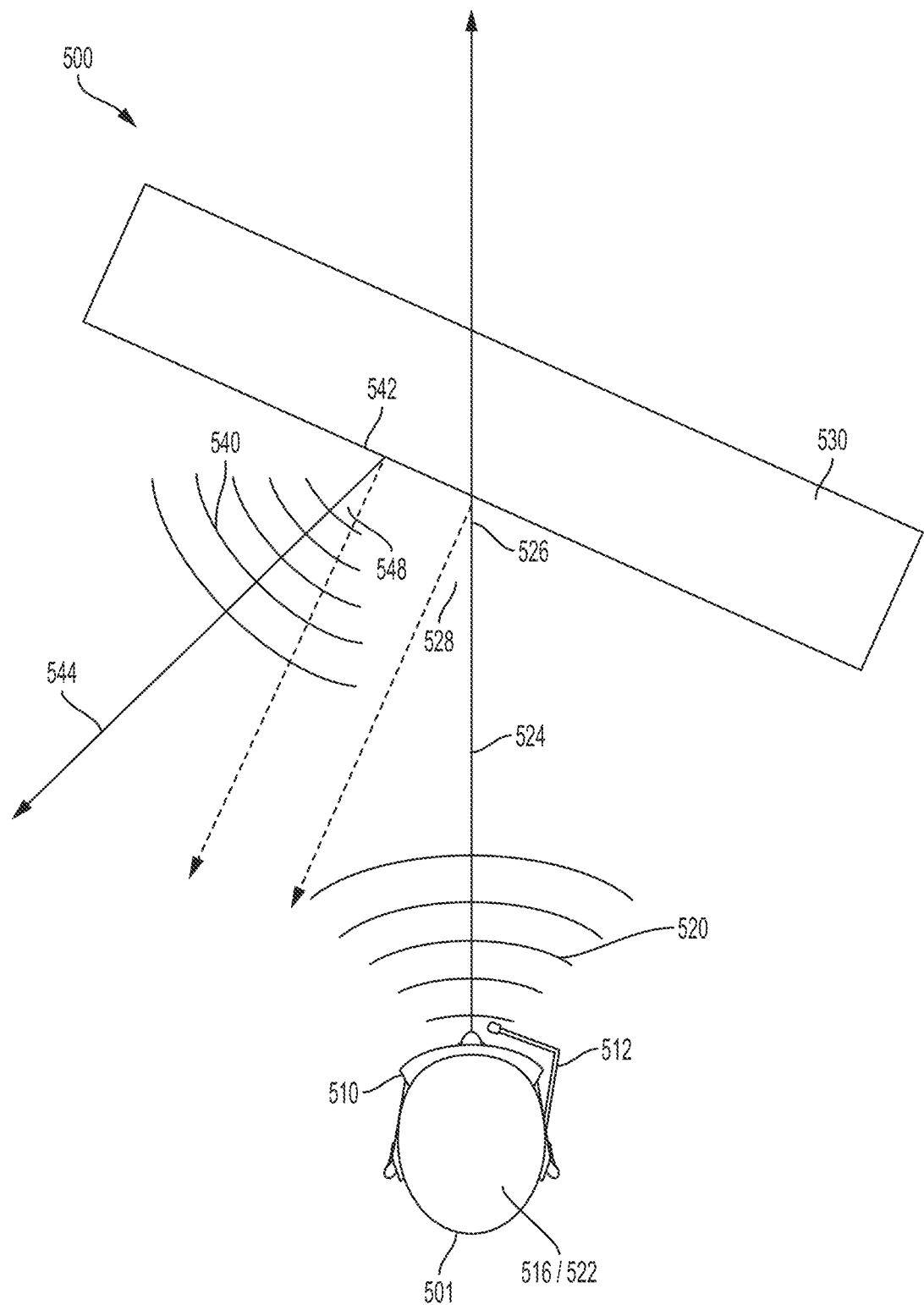

FIGS. 5A and 5B depict a perspective view and a top view, respectively, of an example mixed reality environment 500 (which may correspond to mixed reality environment 150 of FIG. 1C). In MRE 500, user 501 is wearing a wearable head device 510, including a microphone 512. The wearable head device 510 can correspond to the wearable head device 2102 described above with respect to FIGS. 2A-2D, which in turn can correspond to the wearable head device 400A described above with respect to FIG. 4. Microphone 512 is configured to provide voice signals of user 501 as input to mixed reality system 112, so that the user's voice can be properly integrated into the MRE 500.

In example MRE 500, user 501's speech produces one or more real audio signals, including a real audio signal 520, which represents a directional audio signal emitted by user 501 (e.g., a sound ray along which acoustic energy travels), and can have a position and orientation in a coordinate system of MRE 500. In the example, real audio signal 520 originates at an origin coordinate 522 associated with user 501 (e.g., user 501's mouth), and travels along a vector 524 associated with user 501. Vector 524 can represent the propagation of any real audio signal emitted by user 501. Real audio signal 520 may be detected by microphone 512 and provided as input to MRE 500.

Example MRE 500 includes a virtual object 530, which is depicted in FIGS. 5A and 5B as a wall with a planar surface. In the example shown, real audio signal 520 intersects with virtual object 530 at an example intersection point 526, at an angle 528 to the normal 527 of the virtual object at the intersection point 526. In some examples, virtual object 530 may be associated with one or more virtual physical parameters, such as a size, a shape, a mass, or a material. These parameters may affect the simulated reflection of audio signals (such as real audio signal 520) by a surface of virtual object 530. Such parameters can include spatial properties in a coordinate space of a MRE (e.g., position, orientation, shape, dimensions); physical properties (e.g., density; elasticity; tensile strength; temperature; smoothness; resonance); or other suitable properties of an object. The virtual object 530 may be associated with additional parameters that are not related to acoustic reflections such as visual properties (e.g., color, transparency, reflectivity); and other physical parameters (e.g., wetness; electrical conductivity). A mixed reality system can determine such parameters, and accordingly generate virtual objects having those parameters, using any suitable method.

In some examples, virtual objects with which a virtual audio signal intersects may correspond to real objects (e.g., such as real objects 122A, 124A, and 126A correspond to virtual objects 122B, 124B, and 126B in FIG. 1C). In some such examples, the user may be placed in an acoustically sealed environments (e.g., sealed headphones) to attenuate undesired audio signals that may be caused by reflections against the real objects. In some examples, such virtual objects may not correspond to real objects (e.g., such as virtual monster 132 in FIG. 1C). In cases where virtual objects correspond to real objects, the virtual objects may have parameters (e.g., dimensions, materials) that correspond to the properties of those real objects.

In example MRE 500, an example reflected audio signal 540 results when real audio signal 520 intersects with virtual object 530. Reflected audio signal 540 has an origin coordinate 542, and propagates along a vector 544. In the example, origin coordinate 542 lies on a surface of virtual object 530, and vector 544 lies at an angle 548 to the normal of the surface at origin coordinate 542. Typically, but not necessarily, coordinate 542 is the same coordinate as coordinate 526; and angle 548 is equal to angle 528.

Reflected audio signal 540 may represent a simulated acoustic reverberation of real audio signal 520 off of virtual object 530. As such, reflected audio signal 540 may be described as a sonically modified version of real audio signal 520. For example, reflected audio signal 540 may be described as a version of real audio signal 520 that has been attenuated, filtered (e.g., low-pass filtered), and/or phase-shifted and output via the speakers 412, 414, 2134, 2136. In some examples, virtual object 530 causes diffraction effects that affect the frequency spectrum of reflected audio signal 540. Further, reflected audio signal 540 may be a composite of two or more signals obtained by reverb processing techniques (e.g., versions of real audio signal 520 that are temporarily stored and output after a delay), for instance to simulate a natural reverb effect. The adjustments to real audio signal 520 to generate reflected audio signal 540 may be considered to be one or more transfer functions (e.g., a transfer function H(t)), such that the one or more transfer functions when applied to real audio signal 520 result in reflected audio signal 540.

Example reflected audio signal 540 may be a virtual audio signal that is not directly perceptible by a user of the MRE, but that can be converted to a real audio signal by one or more speakers (e.g., speakers 2134 and/or 2136), which real audio signal can be heard by the user. For example, reflected audio signal 540 may be a computational representation, for instance by a processor and/or memory associated with a MRE, of digital audio data that could be converted to an analog signal via a digital-audio converter (e.g., as part of DSP audio spatializer 422 of FIG. 4); and then amplified and used to drive a speaker, producing sound perceptible by a listener. Such computational representation can comprise, for example, a coordinate in the MRE at which the reflected audio signal originates; a vector in the MRE along which the reflected audio signal propagates; a time at which the reflected audio signal originates; a speed at which the reflected audio signal propagates; or other suitable characteristics. Various techniques, such as ray-tracing, can be used to model propagation from the audio source (e.g., user's vocal apparatus) to a reflection point on a virtual object and back to user's ears. As one example, in the case of a user facing a flat surface of a virtual object, a virtual image of an audio source (an "image source") can be spaced from the user's mouth along a segment that is twice the distance to the flat surface (i.e., twice the length of the shortest path to the flat surface) and perpendicular to the flat surface. The reflected acoustic wave path of the user's voice can be modeled as acoustic wave propagation from the virtual image of the audio source to a listener position. (In this example, for the virtual reflection to exist, the extent of the virtual flat surface must be large enough so that the path from the virtual image to the listener position passes through the flat surface.) Polyhedral representations of virtual objects that include numerous flat surfaces can be maintained in the audio visual content memory 418.

A MRE may include a representation of one or more listener coordinates (e.g., coordinate 516 in FIGS. 5A and 5B), each of which corresponds to a location in a coordinate system (a "listener") at which a reflected audio signal can be perceived. In some examples, a MRE may also include a representation of one or more listener vectors, which can represent an orientation of a listener. Listener coordinate 516 can have a spatial relationship to a position of user 501, such as may be determined using one or more sensors of wearable head device 510; for instance, listener coordinate 516 may have a fixed or variable spatial offset relative to a position of user 501. In the example MRE 500 shown, listener coordinate 516 corresponds to origin coordinate 522 (the center of the user's head), which in the example is the origin of real audio signal 520. However, in some examples, a listener coordinate need not correspond to the origin of real audio signal 520, and can correspond to the location of a user's ear, the location of a speaker of wearable head device 510, or another suitable location. Further, a listener vector can correspond to the direction in which the user faces. In some examples, listener coordinates and/or listener vectors can be determined using a position and/or orientation of a wearable head device worn by the user; for example, listener coordinate 516 can be defined as an offset from a detected position of the wearable head device. In some cases, listener coordinates and listener vectors can be detected via one or more sensors described above with respect to wearable head device 510 (e.g., IMUs, GPS units, accelerometers, acoustic sensors, cameras, radar, etc.), or any other suitable sensors. In some examples, a MRE can include left and right listener coordinates, corresponding to the locations of the user's left and right ears, respectively, in a coordinate system of the MRE. By determining a vector of a reflected audio signal from its origin (the image source) to the listener coordinate, a real audio signal can be determined that corresponds to how a human listener with an ear at that coordinate would perceive the reflected audio signal. This audio signal can then be rendered to the user 501, for example via one or more speakers (e.g., 2134, 2136) of wearable head device 510.

In some examples, reflected audio signal 540 comprises base sound data (e.g., digital data in a memory, the data representing an audio waveform) and a transfer function comprising one or more parameters that can be applied to that base sound data. Such parameters may correspond to attenuation of the base sound (e.g., a volume drop-off); filtering of the base sound (e.g., a low-pass filter); time delay (e.g., phase shift) of the base sound; or other suitable parameters. In some examples, such parameters may include input parameters for a MIDI engine, or for an artificial reverb engine for applying artificial reverb and echo effects.

In some examples, a transfer function can make a relationship of the listener coordinate to the reflected audio signal. For example, a transfer function could define the amplitude of the real audio signal to be a decreasing function of distance from a listener coordinate to the origin of the reflected audio source (the image source)—that is, the gain of the reflected signal decreases as the distance from the listener to the origin increases. As another example, a transfer function could define a low-pass filter applied to a reflected audio signal to be a function of the distance of the listener coordinate (and/or the angle of a listener vector) to the propagation vector of the reflected audio signal; for instance, a listener far away from the reflected audio signal may perceive less high frequency power in the signal than would a listener closer to the signal. As a further example, a transfer function could define a time delay (e.g., phase shift) to be applied based on the distance between the listener coordinate and the origin of the reflected audio signal. In some examples, one or more characteristics of a relationship of the user's head to the reflected audio signal can be incorporated in a head-related transfer function (HRTF), which can be selected (e.g., based on coordinates of virtual object 530 relative to the user's head) and applied to a real audio signal. In some examples, DSP audio spatializer 422 of FIG. 4 can utilize a HRTF to present an audio signal that incorporates the position and orientation of the user's head.

Some characteristics of a transfer function applied to real audio signal 520 (and thus affecting virtual reflected audio signal 540) may be determined or influenced by virtual object 530. For example, the transfer function could comprise an attenuation of a real audio signal (resulting in the corresponding reflected audio signal appearing quieter to the listener) based on a parameter (e.g., a material or dimension) of virtual object 530. The transfer function could also comprise a low-pass filter applied to the real audio signal, resulting in the reflected audio signal appearing more muffled as high-frequency content is rolled off, based on a parameter of virtual object 530. This can allow reflected audio signal 540 to meet a user's expectations of what acoustic reflections of real audio signal 520 against virtual object 530 should sound like: for instance, a user would expect certain types of virtual objects (e.g., a virtual thick curtain) to result in a greater degree of attenuation or low-pass filtering than other types of virtual objects, such as a virtual glass wall. In some cases, reflected audio signal 540 may be delayed, relative to real audio signal 520, based on a distance between virtual object 530 and the user; this can simulate the natural delay caused by the travel time of an audio signal from the user to a reflecting object, and back again to the user. In some cases, virtual objects may apply a phase shift, or other effects, to the real audio signal. In some examples, virtual objects may result in wavelength-dependent diffraction effects which may alter the frequency spectrum of reflected audio signals. These diffraction effects may be based, for example, on an angle and size of a surface intersecting the real audio signal. In some cases, the effect that a virtual object has on a real audio signal can be determined by a physical modeling of the virtual object—for example, if the virtual object corresponds to a particular material (e.g., brick, aluminum, water), the transfer function could incorporate the known density and speed of transmission of an audio signal through that material in the real world.

Figure 6:
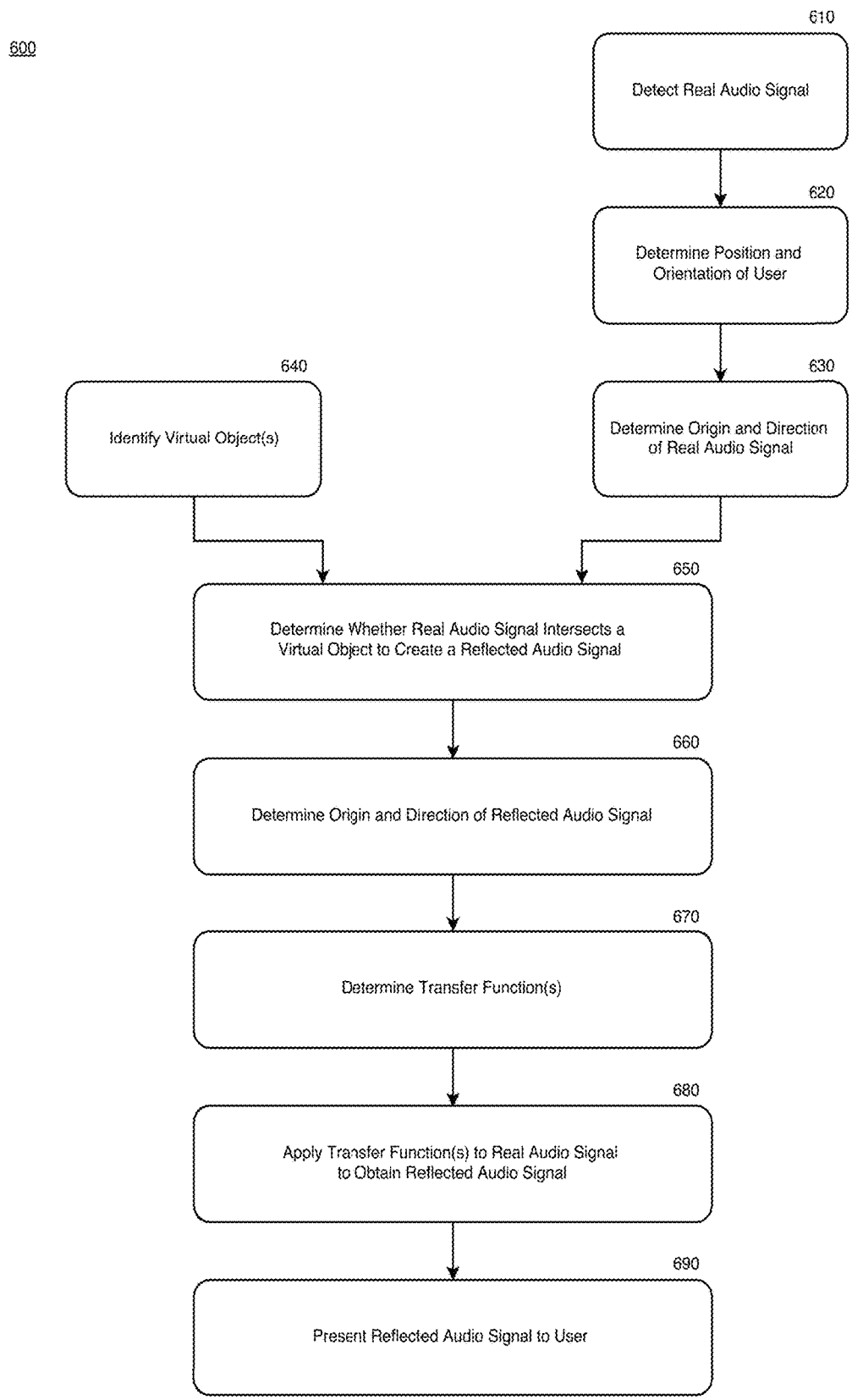
FIG. 6 illustrates an example flow chart of a process for presenting a reflected audio signal to a user of a mixed reality environment.

FIG. 6 shows an example process 600 for presenting a reflected audio signal to a user of a MRE, such as a user of mixed reality system 112. Example process 600 may be implemented by one or more processors (e.g., corresponding to processor 416 of FIG. 4) and/or a DSP module (e.g., corresponding to DSP audio spatializer 422 of FIG. 4) of wearable head device 510, or by any other suitable circuitry. It should be noted that the steps of example process 600 may be performed in any suitable order; the disclosure is not limited to the particular sequence of steps depicted in the example shown.

At stage 610 of process 600, a real audio signal (e.g., real audio signal 520) is detected by one or more microphones, such as microphone 512. The real audio signal may, but need not, correspond to sound generated by user 501 (e.g., sound generated by user 501's voice or body movements). In some embodiments, the real audio signal may correspond to sounds not generated by user 501. Microphone 512 may be used to input the real audio signal, for example via a A/D converter, to a processor (e.g., processor 416 of FIG. 4) and/or a memory (e.g., memory 418 of FIG. 4) or other storage element, such as a shift register, which can store digital data corresponding to the real audio signal. Preprocessing (e.g., feedback cancellation, anti-aliasing, amplification) may be applied to the real audio signal to condition the real audio signal for additional processing.

At stage 620 of process 600, one or more positions and/or orientations of user 501, or wearable head device 510, can be determined, for example using sensors and/or an IMU of wearable head device 510, as described above. Positions and orientations can be updated in real time, for example as the user's head moves and rotates within MRE 500. A position determined at stage 620 may correspond to a position of the user's head (e.g., the center of the user's head); a position of the user's ear; a position of the user's mouth; or a position of the head-mounted device. An orientation determined at stage 620 may correspond to the direction the user is facing.

At stage 630 of process 600, an origin coordinate (e.g., coordinate 522) and a direction vector (e.g., vector 524) corresponding to the real audio signal (detected at stage 610) is determined. A direction vector can comprise an orientation vector as well as, in some examples, a directivity pattern. In some examples, the origin coordinate may be identical to the user's position determined at stage 620. In some examples, such as where the real audio signal corresponds to the sound of the user's voice, the origin coordinate may correspond to a position of the user's mouth (detected, for example, using sensors associated with wearable head device 510, or assumed to be at a fixed offset relative to the wearable head device 510). In some examples, such as where the real audio signal corresponds to the user's voice, the direction vector may correspond to the orientation of the user determined at stage 620 (e.g., the direction in which the user is facing). This can be determined in some examples using one or more suitable sensors, such as sensors described above with respect to wearable head device 510 (e.g., IMUs, accelerometers), or from external sources (e.g., databases). In some examples, two or more microphones or other sensors may be used to identify a direction in which the real audio signal is traveling (e.g., by measuring the time delay between when the signal reaches each of two microphones).

At stage 640 of process 600, one or more virtual objects (e.g., virtual object 530) in MRE 500 are identified. Such identification can include one or more of a position, orientation, shape, boundary, and any parameter described above with respect to a virtual object (e.g., material type). In some implementations, a virtual object can be overlaid or fixed relative to a real object (e.g., a hand controller), and a calculated acoustic reflection of the virtual object may be stronger than the acoustic reflection associated with the real object; in such examples, the acoustic reflection of the virtual object can be synthesized by the system 112 as described herein. In some examples, virtual objects (e.g., virtual monster 132) may not correspond to any real objects. In such examples, virtual objects can be identified in any suitable manner, such as by iterating through a list of virtual objects in MRE 500, identifying which virtual objects in the list are within a threshold distance from user 501 in MRE 500, and identifying relevant information (e.g., position, orientation) associated with those virtual objects.

At stage 650, it can be determined whether the real audio signal detected at stage 610, originating at the origin coordinate identified at stage 630 and traveling in the direction identified at stage 630, should result in a reflected audio signal (e.g., reflected audio signal 540). That is, it can be determined whether the real audio signal intersects a surface of a virtual object in MRE 500 such that it is desirable to present a reflected audio signal to the user. (In some cases, it may not be desirable to present such a reflected audio signal—for example, if the reflected audio signal would not be perceptually significant to the user, or if there are insufficient computational resources.) This determination can be performed by using any suitable method for determining whether a vector (e.g., the vector describing the direction of travel of the real audio signal) intersects with a surface in a three-dimensional coordinate system (e.g., coordinate system 108). If it is determined that it would be desirable to present a reflected audio signal to the user, it can be further determined at stage 650, using any suitable method, at what coordinate (e.g., coordinate 526) the real audio signal intersects the surface of the virtual object, and at what angle (e.g., the angle, such as angle 528, between the direction vector of the real audio signal, and the normal to the surface at the intersection coordinate). In some examples, second-order reflections may result if the real audio signal intersects multiple virtual objects—for example, where a first reflected audio signal itself intersects with a virtual object, creating a second-order reflected audio signal (which can be determined recursively using process 600). Further, in some examples, a real audio signal intersecting a virtual object may result in two or more reflected audio signals (e.g., in the case of wave diffraction, where different acoustic frequencies can be reflected with different intensities at different angles).

In some examples, at stage 650, an audio wave incident on a virtual object can be determined. The determination may take into account the frequency-dependent directivity of the source (e.g., a user's vocal apparatus), and thus determine a frequency-dependent incident wave amplitude at the virtual object. The position and orientation of the user's head and the position and orientation of any virtual object surfaces can be used in determining the incident wave. In some examples, there may be a programmed distance limit beyond which no reflection of user generated sounds will be generated.

At stage 660, if it has been determined at stage 650 that the real audio signal intersects a virtual object to create a reflected audio signal, an origin coordinate (e.g., coordinate 542) and direction vector (e.g., vector 548) for that reflected audio signal can be determined. In many cases, the origin will be identical to the intersection point of the real audio signal and the virtual object. Further, in many cases, the direction vector of the reflected audio signal will simply be the direction vector of the real audio signal, reflected with respect to the normal of the intersected surface at the point of intersection. However, for some audio signals and virtual objects (e.g., virtual objects that cause significant wave diffraction), it may be that the origin and/or direction of the reflected audio signal bear a more complex geometric relationship to the real audio signal.

In some examples, at stage 660, a wave reflected back to the user from a virtual object can be determined. The virtual object may have an ascribed (e.g., pre-programmed) specular acoustic property in which case the reflected wave can be determined by simple ray tracing, or, in some examples, by diffraction analysis. In some examples, the virtual object may also have an ascribed diffuse characteristic such that diffusive spreading of the reflected wave can be taken into account. In some examples, wavelength dependence or frequency dependence of diffraction and diffusion can be utilized in determining the reflected wave.

At stage 670, one or more transfer functions can be determined that, when applied to the real audio signal, will produce a reflected audio signal with the desired sonic characteristics—that is, the reflected audio signal that a user would expect to hear at listener coordinate 516 (and, in some examples, at a particular listener orientation). As described above, these transfer functions can incorporate one or more of attenuation, filtering, time delay, phase shift, or other suitable effects. Transfer functions can accept as input the real audio signal detected at stage 610, and one or more parameters comprising the user's position and/or orientation determined at stage 620; the listener coordinate 516 (which may be equal to the user's position); a listener orientation (which may be equal to the user's orientation); the origin and/or direction of the real audio signal determined at stage 630; the origin and/or direction of the reflected audio signal determined at stage 660; a parameter of the MRE (e.g., the speed at which sound waves propagate in the MRE); and/or a parameter of a virtual object (e.g., material, density, thickness, resonance, or any other suitable parameter such described above) identified at stage 650.

In some examples, the magnitude of the transfer function may be wavelength dependent. If the wavelength corresponding to a particular frequency is comparable to or larger than the size of a wave scattering object (e.g., virtual object), then the scatter pattern (e.g., a directivity of a scattered wave) can typically be modeled by diffraction. Longer wavelengths are diffracted into a wider angular distributions. Surface texture can also affect the angular distribution of sound scattered by an object. If the surface texture has a scale that is much smaller than the wavelength corresponding to a particular frequency band of the sound, the scattering effect due to the surface texture may be negligible. However, for frequencies at which the wavelength is comparable to the surface texture scale, the scattering effect of the surface texture can be significant. Empirical models of the acoustic scatter of various surface textures may be obtained from experimental data. When synthesizing the reflection of user-generated sounds by virtual objects, a frequency (wavelength) dependent scatter pattern may be used to determine a frequency-specific transfer function describing the reflection of user generated sounds back to the user. Such a scatter pattern may be based on diffraction effects related to size, shape, or texture. A transfer function may, but need not be, based on physical modeling of the acoustic wave scattering that can be attributed to virtual objects. In some examples, the transfer function for virtual objects for various distances and incidence angles (e.g., depending on the manner in which the object is disposed relative to the user) may be precomputed and stored for use in the course of real-time augmented reality interaction.

The angle of incidence of a wave on an object surface can be determined by the direction of propagation of a wave, and the surface normal of the surface. Virtual objects sufficiently close to the user's head (e.g., within two wavelengths, for a particular audio frequency) can be said to be in the near-zone (or near field) in which the audio waves are not assumed to be planar. In the near zone, even where an angle of incidence may not be applicable, wave propagation analysis may still be used to obtain the characteristics of the reflected wave, for example as a function of frequency based on the size, shape and mechanical properties of a virtual object. The mechanical properties may be associated with a material (e.g., glass, water) ascribed to the virtual object. The characteristics of the reflected wave can be determined by applying a frequency dependent transfer function to the original audio generated by the user. In some examples, the transfer function may be based on approximations, rather than rigorous wave propagation analysis.

At stage 670, with respect to attenuation, a transfer function can be determined that attenuates the input real audio signal such that the output reflected audio signal is presented at the correct gain level. Typically, the gain of the reflected audio signal will decrease (and thus the attenuation will increase) as the distance between the listener coordinate 516 and the reflected audio signal origin 542 increases. The attenuation may vary directly with the distance; may vary exponentially with the distance; or may bear some other relationship to the distance. In addition, attenuation may depend on the angle (e.g., 528) between the real audio signal and the normal of the intersecting surface of the virtual object: if the angle is small, indicating that a large component of real audio signal is perpendicular to the surface, attenuation may be lower than if the angle is high. This is because audio signals that travel directly into a surface generally result in larger reverberations than do signals that travel mostly parallel to the surface (such that less of the signal's acoustic energy is transferred to the surface). Attenuation may also depend on a parameter of the virtual object; for example, resonance characteristics of the virtual object may result in higher or lower attenuation at resonant frequencies. Attenuation may also depend on a parameter of a ambient medium (e.g., water, air) of the MRE. Other effects on attenuation that can be modeled by a transfer function will be apparent.

At stage 670, with respect to filtering, a transfer function can be determined that filters specific frequencies of the input real audio signal such that the output reflected audio signal possesses the appropriate frequency spectrum. Typically, high frequencies will roll off (e.g., become low-pass filtered) as the distance between the listener coordinate 516 and the reflected audio signal origin 542 increases. The parameters of this low-pass filtering may vary with the distance. Moreover, filtering may depend on the direction of the reflected audio signal relative to listener coordinate 516. For example, low-pass filtering may be stronger if the reflected audio signal travels away from the listener coordinate than if it travels toward the listener coordinate. Filtering may also depend on the angle (e.g., 528) between the real audio signal and the normal of the intersecting surface of the virtual object: for example, with respect to some surfaces, if the angle is small, indicating that a large component of real audio signal is perpendicular to the surface, filtering (e.g., low-pass filtering) may be stronger than if the angle is high. This reflects that audio signals that travel directly into a surface can result in reverberations of a different sonic character than reverberations of signals that travel mostly parallel to the surface. Moreover, oblique angles between the real audio signal and the intersecting surface may result in diffraction of the audio signal. Filtering may also depend on a parameter of the virtual object; for example, filter characteristics may be influenced by a material of the virtual object (e.g., glass, metal). Further, virtual objects associated with particular resonance characteristics may result in more or less attenuation of resonant frequencies of the real audio signal. Filtering may also depend on a parameter of the MRE; for example, filtering may depend on a material (e.g., water, air) associated with the MRE. Other frequency-sensitive effects that can be modeled by a transfer function will be apparent.

At stage 670, with respect to time delay and phase shift effects, a transfer function can be determined that shifts the input real audio signal such that the output reflected audio signal is presented to the user at the correct time. Typically, the shift of the reflected audio signal will increase as the distance between the listener coordinate 516 and the reflected audio signal origin 542 increases. This reflects that sound waves must travel farther and longer to reach the listener coordinate. The shift will typically vary linearly with the distance, but in some examples may bear some other relationship to the distance. In some examples, time delay may be dependent on frequency. Time delay or phase shift may also depend on a parameter of the virtual object, such as a material associated with the surface of the virtual object. Time delay and phase shift may also depend on a parameter of the MRE; for example, time delay and phase shift may depend on a material (e.g., water, air) associated with the MRE. Other effects on time delay and phase shift that can be modeled by a transfer function will be apparent. Similarly, modulation effects can be modeled by a transfer function along the same lines (e.g., with the frequency of oscillation dependent on one or more of the parameters described above).

In some examples, one or more transfer functions determined at stage 670 may comprise a HRTF. A HRTF may process the real audio signal (either as detected at stage 610, or as modified by one or more transfer functions determined at stage 670) according to a position and/or orientation of the user's head with respect to MRE 500. An appropriate HRTF may be selected at stage 670 by a DSP audio spatializer (e.g., DSP audio spatializer 422 of FIG. 4).

At stage 680, the one or more transfer functions identified at stage 670 can be applied to the real audio signal input at stage 610, using any suitable method, to generate the reflected audio signal as output. For example, where the transfer functions comprise a global attenuation, that attenuation, can be applied by multiplying the amplitude of the real audio signal by a gain factor. Where the transfer functions comprise a frequency filter, the filter can be applied to the real audio signal by convolving the real audio signal with the filter in the time domain, or multiplying the real audio signal with the filter in the frequency domain. Where the transfer functions comprise a time delay and/or phase shift, the time delay and/or phase shift can be applied using a shift register, circular buffer, or other suitable storage element, with audio data shifted within the storage element according to the desired time delay and/or phase shift. In some examples, transfer functions may be recursively applied to the real audio signal, such that a first output of a transfer function is provided as input to a transfer function, which will produce a second output. Other suitable methods of applying the transfer functions to the real audio signal will be apparent. For example, a MIDI engine and/or reverb engine may be supplied with the real audio signal and one or more parameters as input, which will output the desired reflected audio signal.

At stage 690, the reflected audio signal output from stage 680 can be presented to user 501 as one or more audio signals. Stage 690 can incorporate any suitable mixing techniques to generate these audio signals. In some examples, the system 112 can include non-occluding speakers which will naturally present real sounds from the environment in addition to the reflected audio signal output. However, in some examples, the system 112 can include occluding speakers (e.g., over-the-ear headphones, noise-canceling headphones, or earbuds with silicone seals) that occlude real sounds from the environment. In such examples, such real sounds can be input via microphones; and the reflected audio signal can be mixed with the real audio signal, for example such that the relative gains of the reflected audio signal and the real audio signal produce a balance of the two signals that is consistent with the user's expectations.

In some examples, the reflected audio signal, with or without the real audio signal mixed in, is composited with other sounds of MRE 500. In some examples, the gain or frequency spectrum of the reflected audio signal may be adjusted based on events or conditions of MRE 500; for example, MRE 500 may execute a script that results in a programmatic adjustment of global reverb levels, which can result in a gain factor being applied to reflected audio signals at stage 690. In examples involving stereo audio, different audio signals can be determined for separate left and right channels. In examples involving mono audio, audio signals can be mixed into a single mono signal that is presented to both ears. The mixed audio signals can be converted to left and right analog signals (e.g., by a D/A converter and/or DSP audio spatializer 422 of FIG. 4) that are amplified and presented to left and right speakers 2134 and 2136, respectively.

Figure 7:
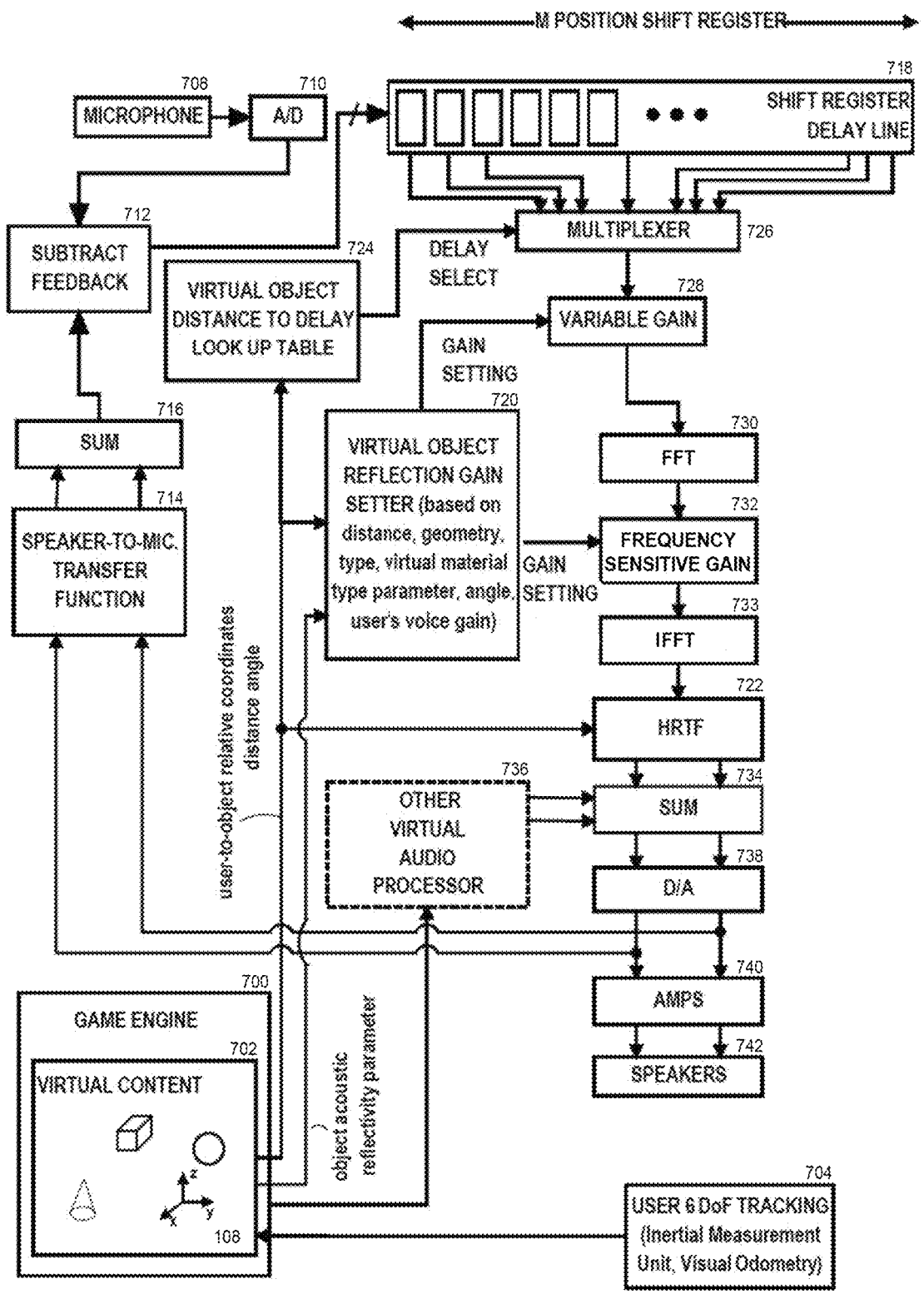
FIG. 7 illustrates an example functional block diagram of an example system for presenting a reflected audio signal to a user of a mixed reality environment.

FIG. 7 depicts an example use of functional components (e.g., components of wearable head device 510 and/or MRE 500) to implement aspects of example process 600 described above. The components illustrated may be implemented in any suitable hardware component, such as the components described above with respect to FIG. 4 (e.g., processor 416; GPU 420; DSP audio spatializer 422); HRTF memory 425; audio visual content memory 418). The components may further be implemented on any suitable combination of the wearable head device 400A, handheld controller 400B, and/or auxiliary unit 400C. FIG. 7 depicts an example game engine 700 with virtual content 702, which may comprise one or more virtual objects such as virtual object 530 described above, and a coordinate system 108 such as described above. Game engine 700 and/or virtual content 702 may comprise virtual components of a mixed reality environment, such as MRE 500 described above, and may be stored, executed, and/or presented to a user via a wearable head device, such as wearable head device 2102 described above.

In FIG. 7, microphone 708 (which may correspond to microphone 512) can be configured to detect a real audio signal, such as at stage 610 of example process 600. As described above with respect to stage 610, the signal input by the microphone may undergo preprocessing via A/D conversion (710) and feedback cancellation (712). Feedback cancellation may be performed by computing a difference between the input signal and one or more previously output audio signals (e.g., as processed via speaker-to-microphone transfer function 714 and summer 716). The preprocessed audio signal can be stored digitally in shift register 718, which may be configured to store any suitable number of bits (and thus audio samples). In some examples, the functions of the shift register may be implemented using a memory.

In FIG. 7, game engine 700, as part of a mixed reality environment, can be configured to perform steps 620, 630, 640, 650, and 660 as described above with respect to example process 600. For instance, Game engine 700 may perform six-degree-of-freedom tracking 704 (i.e., comprising three degrees of translation and three degrees of rotation) of a user, such as user 501, using sensors and tracking hardware of wearable head device 2102. This may provide input used to determine a position (e.g., origin 522) and/or orientation of the user (step 620), and an origin and direction (e.g., 524) of the real audio signal (step 630), as described above. Game engine 700 may further identify one or more virtual objects of virtual content 702 (step 640), and determine whether (and to what extent) the real audio signal intersects any such virtual objects (step 650). If so, game engine 700 may determine an origin (e.g., 542) and direction (544) of the resultant reflected audio signal (step 660).

Game engine 700 may output one or more parameters corresponding to virtual objects comprising virtual content 702, such as virtual objects with which real audio signal intersects. Game engine 700 may also output a position and/or an orientation of a user relative to a virtual object of virtual content 702. Game engine 700 may also output other spatial information relating to the user with respect to a virtual object, such as the distance and/or angle of the user relative to that virtual object.

Game engine 700, alone or in conjunction with other components, may determine a transfer function according to step 670 of process 600. For example, game engine 700 in conjunction with virtual object reflection gain setter 720 may determine a level of attenuation, such as described above with respect to step 670, to be applied to the real audio signal. Additionally, game engine 700 may identify a HRTF 722 to be applied to the real audio signal. Other aspects of determining a transfer function at step 670 may be performed by game engine 700 as described above.

FIG. 7 shows various functional components that may be used to apply a transfer function to the real audio signal to obtain a reflected audio signal, such as described above with respect to stage 680 of process 600. For example, to implement a time delay aspect of a transfer function, game engine 700 can utilize a lookup table 724 to apply a time delay to the real audio signal. Time delays that are stored in the lookup table 724 can be decreased in value to take into account the propagation delay from the user to the microphone 708. Game engine 700 can, for instance, provide a distance from a listener coordinate to a virtual object as input to lookup table 724, which lookup table could then output one or more control signals to a multiplexer 726. Multiplexer 726 could in turn use the control signals to select data from shift register 718 corresponding to the desired amount of time delay.

Similarly, to implement an attenuation aspect of a transfer function, the output of multiplexer 726 could be provided to a variable gain stage 728, with a level of attenuation set by virtual object reflection gain setter 720, as described above. This attenuation may be provided at variable gain stage 728 by applying a simple multiplier, corresponding to the level of attenuation, to the output of multiplexer 726.

Likewise, to implement a filtering aspect of a transfer function, the output of variable gain stage may be separated by frequency band, for example using a fast Fourier transform 730 and corresponding inverse transform 733. In some examples, time domain filtering (e.g., a running average, finite impulse response (FIR) filters, or infinite impulse response (IIR) filters) may be used. An appropriate level of attenuation (e.g., as selected by virtual object reflection gain setter 720) may then be applied on a per-frequency-band basis at frequency-sensitive gain stage 732, for instance by multiplying each frequency band by the determined level of attenuation.

HRTF 722, for example selected by game engine 700 as described above, can be applied to the signal output by frequency-sensitive gain stage 732; the combination of the HRTF 722 and the frequency-sensitive gain can be used to determine an overall frequency-dependent gain.

As described above with respect to stage 690 of process 600, the reflected audio signal output by HRTF 722 can be mixed at stage 734 in preparation for presentation to the user. For example, stage 734 can create one or more composite audio signals (e.g., a single mono audio signal, or left/right stereo audio signals) by summing the output of HRTF 722 with other audio signals associated with game engine 700 (e.g., corresponding to virtual content 702). These audio signals may be provided by a virtual audio processor 736, which may send audio output to stage 734 to be composited with the output of HRTF 722. At stage 738, the composite audio signals are processed by D/A converter 738, and amplified at stage 740 to drive speakers 742 (e.g., corresponding to speakers 2134 and 2136), which ultimately present the resultant audio signal to the user.

It should be noted that the elements of the example functional block diagram shown in FIG. 7 can be arranged in any suitable order. For example, time delay multiplexer 726, variable gain stage 728, frequency-sensitive gain stage 732, fast Fourier transform 730, inverse fast Fourier transform 733, and HRTF 722 may be placed in any suitable order—not necessarily the order shown. The disclosure is not limited to any particular order or arrangement of the functional components shown in the example.

Some examples of the disclosure are directed to a method of presenting an audio signal to a user of a mixed reality environment, the method comprising: detecting a first audio signal in the mixed reality environment, where the first audio signal is a real audio signal; identifying a virtual object intersected by the first audio signal in the mixed reality environment; identifying a listener coordinate corresponding to the position of the user; determining, using the virtual object and the listener coordinate, a transfer function; applying the transfer function to the first audio signal to produce a second audio signal; and presenting, to the user, the second audio signal. Additionally or alternatively to one or more of the examples disclosed above, in some examples, the method further comprises identifying a position of the user in the mixed reality environment, wherein the listener coordinate associated with the user is identified based on the position. Additionally or alternatively to one or more of the examples disclosed above, in some examples, detecting the first audio signal comprises detecting a voice signal generated by the user. Additionally or alternatively to one or more of the examples disclosed above, in some examples, the method further comprises identifying an orientation of the user in the mixed reality environment, wherein the transfer function is determined using the orientation of the user. Additionally or alternatively to one or more of the examples disclosed above, in some examples, the first audio signal is a user-generated signal. Additionally or alternatively to one or more of the examples disclosed above, in some examples, the method further comprises determining an angle at which the first audio signal intersects the virtual object, wherein the transfer function is determined using the angle. Additionally or alternatively to one or more of the examples disclosed above, in some examples, the first audio signal is associated with a direction in the mixed reality environment, and the transfer function is determined using the direction. Additionally or alternatively to one or more of the examples disclosed above, in some examples, the virtual object is associated with a material, and the transfer function is determined using the material. Additionally or alternatively to one or more of the examples disclosed above, in some examples, the transfer function comprises a function of one or more of time, frequency, gain, and phase. Additionally or alternatively to one or more of the examples disclosed above, in some examples, the transfer function comprises a head-related transfer function. Additionally or alternatively to one or more of the examples disclosed above, in some examples, the method further comprises determining an origin and direction of the second audio signal in the mixed reality environment, wherein the transfer function is determined using the origin and direction of the second audio signal. Additionally or alternatively to one or more of the examples disclosed above, in some examples, the first audio signal is detected using a microphone associated with a wearable head device worn by the user. Additionally or alternatively to one or more of the examples disclosed above, in some examples, the method further comprises presenting, to the user via a display, the virtual object.

Some examples of the disclosure are directed to a system comprising: a wearable head device including: a display for displaying a mixed reality environment to a user, the display comprising a transmissive eyepiece through which a real environment is visible; a microphone; a speaker; and a sensor configured to detect one or more of a position and an orientation of the wearable head device in the mixed reality environment; one or more processors configured to perform: detecting, via the microphone, a first audio signal in the mixed reality environment, where the first audio signal is a real audio signal; identifying a virtual object intersected by the first audio signal in the mixed reality environment; presenting, to the user via the display, the virtual object; identifying, via the sensor, a position of the wearable head device in the mixed reality environment; identifying a listener coordinate using the position of the wearable head device; determining, using the virtual object and the listener coordinate, a transfer function; applying the transfer function to the first audio signal to produce a second audio signal; and presenting, to the user via the speaker, the second audio signal. Additionally or alternatively to one or more of the examples disclosed above, in some examples, detecting, via the microphone, the first audio signal comprises detecting, via the microphone, a voice signal generated by the user. Additionally or alternatively to one or more of the examples disclosed above, in some examples, the one or more processors are further configured to perform identifying, via the sensor, an orientation of the wearable head device in the mixed reality environment, and the transfer function is determined using the orientation of the wearable head device. Additionally or alternatively to one or more of the examples disclosed above, in some examples, the one or more processors are further configured to perform identifying a position of the user in the mixed reality environment, wherein the listener coordinate associated with the user is identified based on the position. Additionally or alternatively to one or more of the examples disclosed above, in some examples, detecting the first audio signal comprises detecting a voice signal generated by the user. Additionally or alternatively to one or more of the examples disclosed above, in some examples, the one or more processors are further configured to perform identifying an orientation of the user in the mixed reality environment, and the transfer function is further determined using the orientation of the user. Additionally or alternatively to one or more of the examples disclosed above, in some examples, the first audio signal is a user-generated signal. Additionally or alternatively to one or more of the examples disclosed above, in some examples, the one or more processors are further configured to perform determining an angle at which the first audio signal intersects the virtual object, and the transfer function is determined using the angle. Additionally or alternatively to one or more of the examples disclosed above, in some examples, the first audio signal is associated with a direction in the mixed reality environment, and the transfer function is determined using the direction. Additionally or alternatively to one or more of the examples disclosed above, in some examples, the virtual object is associated with a material, and the transfer function is determined using the material. Additionally or alternatively to one or more of the examples disclosed above, in some examples, the transfer function comprises a function of one or more of time, frequency, gain, and phase. Additionally or alternatively to one or more of the examples disclosed above, in some examples, the transfer function comprises a head-related transfer function. Additionally or alternatively to one or more of the examples disclosed above, in some examples, the one or more processors are further configured to perform determining an origin and direction of the second audio signal in the mixed reality environment, and wherein the transfer function is determined using the origin and direction of the second audio signal.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method of presenting an audio signal to a user of a mixed reality environment, the method comprising:
   identifying a first audio signal in the mixed reality environment;
   identifying a virtual object intersected by the first audio signal in the mixed reality environment;
   identifying, via one or more sensors of a wearable head device, a position of the user in the mixed reality environment;
   identifying, based on the position of the user, a listener coordinate associated with the user;
   determining, based on the virtual object and based further on the listener coordinate, a transfer function;
   generating a second audio signal based on the first audio signal and based further on the transfer function; and
   presenting, to the user, the second audio signal.

2. The method of claim 1, wherein said identifying the first audio signal comprises detecting a voice signal generated by the user.

3. The method of claim 1, further comprising identifying, via the one or more sensors, an orientation of the user in the mixed reality environment, wherein the transfer function is determined based further on the orientation of the user.

4. The method of claim 1, further comprising determining an angle at which the first audio signal intersects the virtual object, wherein the transfer function is determined based further on the angle.

5. The method of claim 1, wherein the first audio signal comprises a virtual audio signal.

6. The method of claim 1, further comprising determining an origin and a direction of the second audio signal in the mixed reality environment, wherein the transfer function is determined based further on the origin and the direction of the second audio signal.

7. The method of claim 1, further comprising presenting, to the user via a see-through display of the wearable head device, the virtual object.

8. A system comprising:
   a wearable head device including a see-through display configured to present a mixed reality environment to a user;
   a speaker;
   one or more sensors; and
   one or more processors configured to perform a method comprising:
      identifying a first audio signal in the mixed reality environment;
      identifying a virtual object intersected by the first audio signal in the mixed reality environment;

identifying, via the one or more sensors, a position of the user in the mixed reality environment;

identifying, based on the position of the user, a listener coordinate associated with the user;

determining, based on the virtual object and based further on the listener coordinate, a transfer function;

generating a second audio signal based on the first audio signal and based further on the transfer function; and presenting, to the user via the speaker, the second audio signal.

9. The system of claim 8, wherein the system further comprises a microphone and wherein said identifying the first audio signal comprises detecting, via the microphone, a voice signal generated by the user.

10. The system of claim 8, wherein the method further comprises identifying, via the one or more sensors, an orientation of the user in the mixed reality environment, wherein the transfer function is determined based further on the orientation of the user.

11. The system of claim 8, wherein the method further comprises determining an angle at which the first audio signal intersects the virtual object, wherein the transfer function is determined based further on the angle.

12. The system of claim 8, wherein the first audio signal comprises a virtual audio signal.

13. The system of claim 8, wherein the method further comprises determining an origin and a direction of the second audio signal in the mixed reality environment, wherein the transfer function is determined based further on the origin and the direction of the second audio signal.

14. The system of claim 8, wherein the method further comprises presenting, to the user via the see-through display, the virtual object.

15. A non-transitory computer-readable medium storing instructions which, when executed by one or more processors, cause the one or more processors to perform a method comprising:

identifying a first audio signal in a mixed reality environment;

identifying a virtual object intersected by the first audio signal in the mixed reality environment;

identifying, via one or more sensors of a wearable head device, a position of a user in the mixed reality environment;

identifying, based on the position of the user, a listener coordinate associated with the user;

determining, based on the virtual object and based further on the listener coordinate, a transfer function;

generating a second audio signal based on the first audio signal and based further on the transfer function; and presenting, to the user, the second audio signal.

16. The non-transitory computer-readable medium of claim 15, wherein said identifying the first audio signal comprises detecting a voice signal generated by the user.

17. The non-transitory computer-readable medium of claim 15, wherein the method further comprises identifying, via the one or more sensors, an orientation of the user in the mixed reality environment, wherein the transfer function is determined based further on the orientation of the user.

18. The non-transitory computer-readable medium of claim 15, wherein the first audio signal comprises a virtual audio signal.

19. The non-transitory computer-readable medium of claim 15, wherein the method further comprises determining an origin and a direction of the second audio signal in the mixed reality environment, wherein the transfer function is determined based further on the origin and the direction of the second audio signal.

20. The non-transitory computer-readable medium of claim 15, wherein the method further comprises presenting, to the user via a see-through display of the wearable head device, the virtual object.

\* \* \* \* \*